US012689159B2

(12) United States Patent
Ebisawa et al.

(10) Patent No.: US 12,689,159 B2
(45) Date of Patent: Jul. 21, 2026

(54) ELECTRICAL CONNECTOR WITH IMPROVED SHIELDING AND ELECTRICAL CONNECTOR PAIR THEREWITH

(71) Applicant: Molex, LLC, Lisle, IL (US)

(72) Inventors: Jumpei Ebisawa, Yamato (JP); Taichi Taniguchi, Yamato (JP); Yoshiteru Nogawa, Yamato (JP); Makoto Shinyama, Yamato (JP); Kenta Sasaki, Yamato (JP)

(73) Assignee: Molex, LLC, Lisle, IL (US)

( * ) Notice: Subject to any disclaimer, the term of this patent is extended or adjusted under 35 U.S.C. 154(b) by 295 days.

(21) Appl. No.: 17/954,353

(22) Filed: Sep. 28, 2022

(65) Prior Publication Data

US 2023/0110507 A1 Apr. 13, 2023

(30) Foreign Application Priority Data

Oct. 1, 2021 (JP) ................................ 2021-162726
Aug. 30, 2022 (JP) ................................ 2022-136482

(51) Int. Cl.
*H01R 13/6582* (2011.01)
*H01R 12/57* (2011.01)
(Continued)

(52) U.S. Cl.
CPC ......... *H01R 13/6582* (2013.01); *H01R 12/57* (2013.01); *H01R 12/73* (2013.01);
(Continued)

(58) Field of Classification Search
CPC .... H01R 13/6582; H01R 12/57; H01R 12/73; H01R 13/2407; H01R 13/62; H01R 13/646; H01R 13/6581; H01R 13/6591; H01R 12/51; H01R 12/55; H01R 12/7011; H01R 12/707; H01R 12/71; H01R 12/712; H01R 12/716; H01R 13/02; H01R 13/22; H01R 13/24; H01R 13/648; H01R 13/658; H01R 13/6594
See application file for complete search history.

(56) References Cited

U.S. PATENT DOCUMENTS 5,207,597 A 5/1993 Kline
11,444,414 B2 * 9/2022 Shimomura ........... H01R 13/50
(Continued)

FOREIGN PATENT DOCUMENTS

CN 101378167 A 3/2009
CN 111416246 A 7/2020
(Continued)

*Primary Examiner* — Justin M Kratt

(57) ABSTRACT

A first connector, that is a first connector that mates with a second connector, containing: a first connector main body; a first terminal attached to the first connector main body; a first high-frequency terminal attached to the first connector main body; and a first shield surrounding an entire circumference of the first connector main body; wherein the first shield contains an oblique part that extends obliquely downward, formed on an inner edge at the upper end, and also contains a plurality of linear parts and a plurality of curved parts; the first connector main body being integrally connected at the curved parts, and the first connector main body being separated at the linear parts.

20 Claims, 20 Drawing Sheets

(51) Int. Cl.

| | |
|---|---|
| ***H01R 12/73*** | (2011.01) |
| ***H01R 13/24*** | (2006.01) |
| ***H01R 13/62*** | (2006.01) |
| ***H01R 13/646*** | (2011.01) |
| ***H01R 13/6581*** | (2011.01) |
| ***H01R 13/6591*** | (2011.01) |
| *H01R 12/51* | (2011.01) |
| *H01R 12/55* | (2011.01) |
| *H01R 12/70* | (2011.01) |
| *H01R 12/71* | (2011.01) |
| *H01R 13/02* | (2006.01) |
| *H01R 13/22* | (2006.01) |
| *H01R 13/648* | (2006.01) |
| *H01R 13/658* | (2011.01) |
| *H01R 13/6594* | (2011.01) |

(52) U.S. Cl.

CPC ......... *H01R 13/2407* (2013.01); *H01R 13/62* (2013.01); *H01R 13/646* (2013.01); *H01R 13/6581* (2013.01); *H01R 13/6591* (2013.01); *H01R 12/51* (2013.01); *H01R 12/55* (2013.01); *H01R 12/7011* (2013.01); *H01R 12/707* (2013.01); *H01R 12/71* (2013.01); *H01R 12/712* (2013.01); *H01R 12/716* (2013.01); *H01R 13/02* (2013.01); *H01R 13/22* (2013.01); *H01R 13/24* (2013.01); *H01R 13/648* (2013.01); *H01R 13/658* (2013.01); *H01R 13/6594* (2013.01)

(56) References Cited

U.S. PATENT DOCUMENTS

| | | | | |
|---|---|---|---|---|
| 11,563,284 | B2 * | 1/2023 | Oosaka | H01R 13/6271 |
| 11,978,972 | B2 * | 5/2024 | Oiwane | H01R 13/6591 |
| 2006/0265732 | A1 | 11/2006 | Nakanishi et al. | |
| 2018/0175561 | A1 | 6/2018 | Chen | |
| 2021/0005990 | A1 * | 1/2021 | Zhang | H01R 12/716 |
| 2021/0359471 | A1 * | 11/2021 | Oosaka | H01R 12/73 |
| 2023/0246359 | A1 * | 8/2023 | Suzuki | H01R 12/716 439/74 |

FOREIGN PATENT DOCUMENTS

| | | | | |
|---|---|---|---|---|
| CN | 112670770 | A | | 4/2021 |
| CN | 214204176 | U | | 9/2021 |
| JP | 2016177884 | A | | 10/2016 |
| JP | 2018078022 | A | | 5/2018 |
| JP | 2021089829 | A | | 6/2021 |
| JP | 2021093346 | A | | 6/2021 |
| JP | 2021111598 | A | | 8/2021 |
| JP | 2021118145 | A | | 8/2021 |
| KR | 20210117930 | A | * | 9/2021 |
| TW | M416222 | U | | 11/2011 |
| TW | M435072 | U | | 8/2012 |
| TW | M608210 | U | | 2/2021 |
| TW | I738170 | B | | 9/2021 |
| WO | 2020073460 | A1 | | 4/2020 |

* cited by examiner

Prior art

ELECTRICAL CONNECTOR WITH IMPROVED SHIELDING AND ELECTRICAL CONNECTOR PAIR THEREWITH

RELATED APPLICATIONS

This application claims priority to Japanese Patent Application Serial No. 2021-162726, filed on Oct. 1, 2021 and Japanese Patent Application Serial No. 2022-136482, filed on Aug. 30, 2022, both of which are incorporated herein by reference in their entireties.

TECHNICAL FIELD

The present disclosure relates to a connector and a connector pair.

BACKGROUND ART

Conventionally, connectors such as substrate-to-substrate connectors have been used to electrically connect pairs of parallel circuit boards to each other. Such connectors are attached to each of opposing surfaces of the pair of circuit boards, and fitted together to secure electric conduction. Furthermore, in order to reduce the influence of noise and radio waves from the outside and also to suppress the emission of noise and radio waves to the outside, a technique of providing a shielding member has been proposed (for example, refer to Patent Document 1).

FIG. 20 is a perspective view illustrating a conventional connector.

In the drawing, 811 represents a housing of a receptacle connector serving as a connector mounted on a surface of a first circuit board (not shown), which has a mating recess 812 into which a plug connector mounted on a surface of a second circuit board (not shown) is inserted and mated. Four sides of the mating recess 812, which has a rectangular shape in plan view, are demarcated by side wall parts 814. Furthermore, in the mating recess 812, a pair of protrusions 813 are formed protruding from a bottom plate 818 thereof. Note that an opening part 818*a* is formed in the bottom plate 818 between the protrusions 813.

Furthermore, a plurality of terminals 861 are respectively attached to each of the protrusions 813 aligned in a longitudinal direction of the protrusions 813. Each terminal 861 has a contacting part 865 protruding from an inner wall surface of the side wall part 814 and a tail part 862 protruding from the protrusion 813 into the opening part 818*a*. The tail part 862 is soldered to a connection pad formed on a surface of the first circuit board. Furthermore, when the receptacle connector is mated with the plug connector, the contacting part 865 contacts a terminal of the plug connector to conduct electricity.

Furthermore, a conductive shell 851 is attached to the housing 811 so as to entirely cover an outer wall surface of the side wall part 814. The conductive shell 851 has a plurality of substrate connecting parts 851*a*, and the substrate connecting parts 851*a* are soldered to the connection pad formed on a surface of the first circuit board. Thus, an outer circumferential surface of the housing 811 is covered by the conductive shell 851. Therefore, an electromagnetic shielding action by the conductive shell 851 is achieved for the receptacle connector and for the plug connector inserted in and mated to the mating recess 812.

Prior Art Documents: Patent Documents: Patent Document 1: Japanese Unexamined Patent Application 2016-177884

SUMMARY

However, this type of conventional connector can not handle the size reduction and increased signal speeds of recent electronic devices. In electronic devices such as laptop computers, tablets, smart phones, digital cameras, music players, game machines, navigation devices, and the like, a compact and low-profile housing and accompanying compact and low-profile components are required, and a high-speed signal is required to handle an increase in the amount of communication data and a higher communication speed and data processing speed. However, the aforementioned conventional connector cannot sufficiently respond to the demand for a compact and low-profile connector because the dimensions of each part of the housing 811 are large and the strength is insufficient when the dimensions of each part are reduced. Furthermore, the speed of various types of signals is increasing, and transmitting high-frequency signals is sometimes required, but the aforementioned conventional connector cannot transmit high-frequency signals because the electromagnetic shielding function is not sufficiently high.

Herein, in order to solve the problems of the conventional connector, an object of the present invention is to provide a highly reliable connector and connector pair that exhibit high strength and achieve a high shielding effect while having a compact and low profile.

Therefore, a first connector is a first connector that mates with a second connector, containing: a first connector main body; a first terminal attached to the first connector main body; a first high-frequency terminal attached to the first connector main body; and a first shield surrounding an entire circumference of the first connector main body; wherein the first shield includes an oblique part that extends obliquely downward, formed on an inner edge at the upper end, and also contains a plurality of linear parts and a plurality of curved parts; the first connector main body being integrally connected at the curved parts, and the first connector main body being separated at the linear parts.

In another first connector, in addition, the first shield includes: an outer wall; an inner wall formed on the inward side of the outer wall; a connecting part that connects an upper end of the outer wall and an upper end of the inner wall; an outwardly extending flange part connected to a lower end of the outer wall; and a housing part with a circumference surrounded by the inner wall, and that houses the second connector; with the inner wall at the linear parts having a mating spring part that elastically connects to the second shield of the second connector.

Furthermore, in another first connector, the outer wall and flange part are connected around the entire circumference of the first connector main body.

With yet another first connector, in addition, the mating spring part is separated from other parts of the inner wall by a slit part at the linear parts.

With yet another first connector, in addition, the mating spring part includes an oblique surface part extending from the connecting part obliquely inward and downward from the housing part, and an inner wall lower part formed at a lower end of the oblique surface part and extending downward.

With yet another first connector, in addition, the curved part includes a gradual oblique surface part that extends from the connecting part obliquely inward and downward from the housing part and has an oblique angle that is more gradual than the oblique surface part.

With yet another first connector, in addition, in the curved part, space demarcated by the outer wall, inner wall, and connecting part is filled with a constituent material of the first connector main body.

With yet another first connector, in addition, the inner wall surface of the curved part is provided with a lockable part, and the constituent material has a locking part that engages with the lockable part.

A connector pair contains a first connector, and a second connector that mates with the first connector.

With another connector pair, in addition, the second connector contains:

a second connector main body;

a second terminal attached to the second connector main body;

a second high-frequency terminal attached to the second connector main body; and a second shield surrounding an entire circumference of the second connector main body; wherein the second shield includes:

a second inner shield extending in a width direction of the second connector between the second terminal and the second high-frequency terminal; and when the first and second connectors are mated, the first and second shields make contact and conduct.

Another first connector mates with a second connector, and contains:

a first connector main body;

a first terminal attached to the first connector main body;

a first high-frequency terminal attached to the first connector main body; and a first shield that encompasses the first connector main body;

wherein the first shield includes four linear parts and four curved parts, and further includes an outer wall, an inner wall inside the outer wall and approximately parallel to the outer wall, and a connecting part connecting an upper end of the outer wall to the upper end of the inner wall;

in the curved part, space demarcated by the outer wall, inner wall, and connecting part is filled with a constituent material of the first connector main body;

the inner wall of the linear parts includes a mating spring portion that can contact the second connector; and when viewed from the mating direction, the first connector body is not present in the region where the mating spring parts are located, and the mating spring parts do not overlap with the first terminal or the first high-frequency terminal.

In another first connector, in addition, an arc length of a cylindrical inner wall of the first connector main body in the curved part is shorter than an arc length of a lower end of the inner wall of the first shield in the curved part.

In yet another first connector, in addition, the location of a lower end of the first connector main body at the curved part is higher than the location of a lower end of the outer wall of the first shield at the curved part.

In yet another first connector, in addition, a lower end of the outer wall of the first shield in the curved part includes a flange part.

With yet another first connector, in addition, the inner wall surface of the curved part is provided with a lockable part, and the constituent material has a locking part that engages with the lockable part.

Another connector pair contains a first connector, and a second connector that mates with the first connector.

With yet another connector pair, in addition, the second connector contains:

a second connector main body;

a second terminal attached to the second connector main body;

a second high-frequency terminal attached to the second connector main body; and a second shield surrounding an entire circumference of the second connector main body; wherein the second shield includes:

a second inner shield extending in a width direction of the second connector between the second terminal and the second high-frequency terminal; and when the first and second connectors are mated, the first and second shields make contact and conduct.

According to the present disclosure, a connector and connector pair can exhibit high strength, achieve a high shielding effect, and have improved reliability while having a compact and low profile.

BRIEF DESCRIPTION OF THE DRAWINGS

FIG. 2A is a view seen obliquely from above, and FIG. 2B is a view seen obliquely from below.

FIG. 4A is an upper surface view, FIG. 4B is a side surface view, and FIG. 4C is a front surface view.

FIG. 6A is a cross-sectional view taken along line A-A in FIG. 4A, and FIG. 6B is a cross-sectional view taken along line B-B in FIG. 4A.

FIG. 7A is a view seen obliquely from above, and FIG. 7B is a view seen obliquely from below.

FIG. 8A is an upper surface view, FIG. 8B is a side surface view, and FIG. 8C is a front surface view.

FIG. 11A is a perspective cross-sectional view along line C-C in FIG. 10; and FIG. 11B is a perspective cross-sectional view along line D-D in FIG. 10.

FIG. 14A is a perspective cross-sectional view along line E-E in FIG. 13; and FIG. 14B is a perspective cross-sectional view along line F-F in FIG. 13.

FIG. 15A is a perspective cross-sectional view along line G-G in FIG. 13; and FIG. 15B is a perspective cross-sectional view along line H-H in FIG. 13.

FIG. 17A is an upper surface view and FIG. 17B is a cross-sectional view as viewed along line I-I in FIG. 17A.

FIG. 18A is an upper surface view and FIG. 18B is a cross-sectional view as viewed along line J-J in FIG. 18A.

FIG. 19A is an upper surface view and FIG. 19B is a cross-sectional view as viewed along line K-K in FIG. 19A.

DETAILED DESCRIPTION OF THE PREFERRED EMBODIMENTS

Embodiments will hereinafter be described in detail with reference to the drawings.

Figure 1:
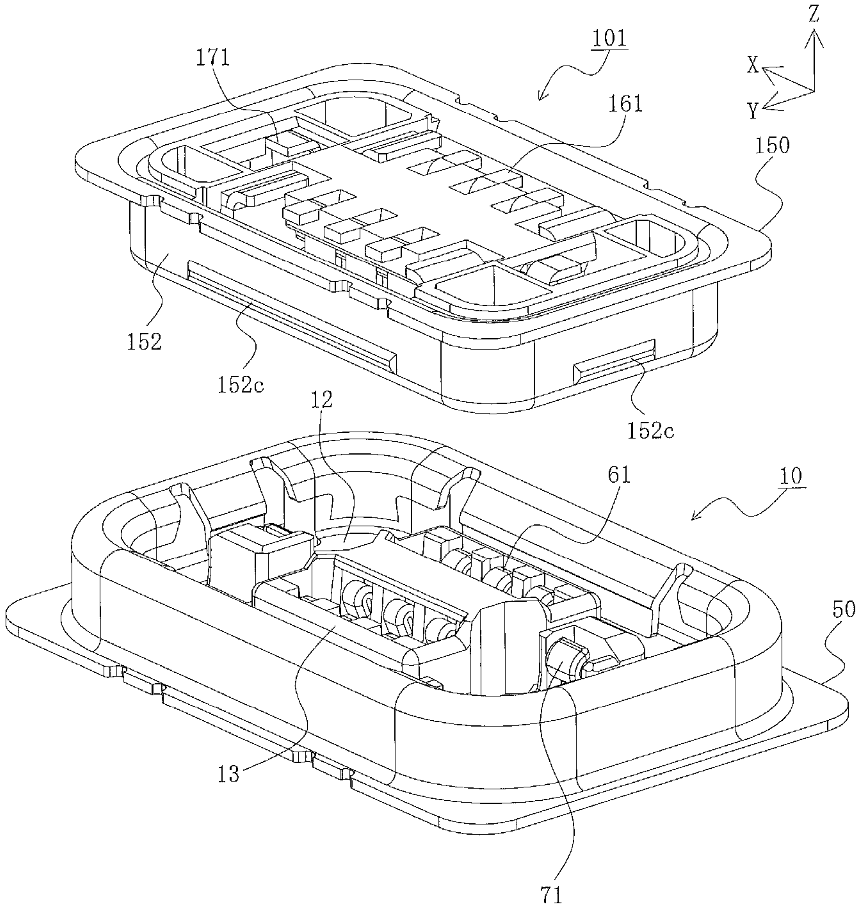
FIG. 1 is a perspective view of a first connector and a second connector according to Embodiment 1 prior to mating.
Figure 2A:
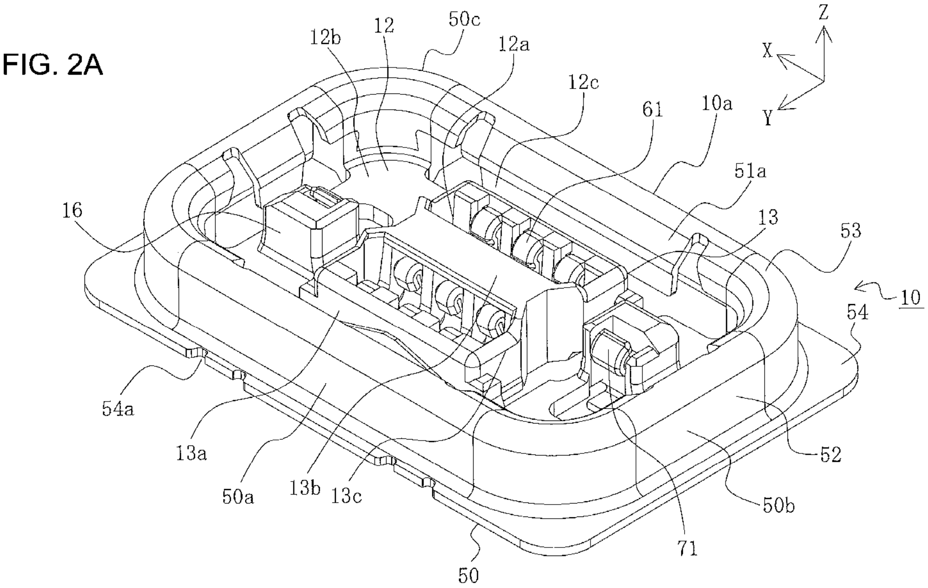
FIGS. 2A and 2B are perspective views illustrating a first connector of Embodiment 1.
Figure 2B:
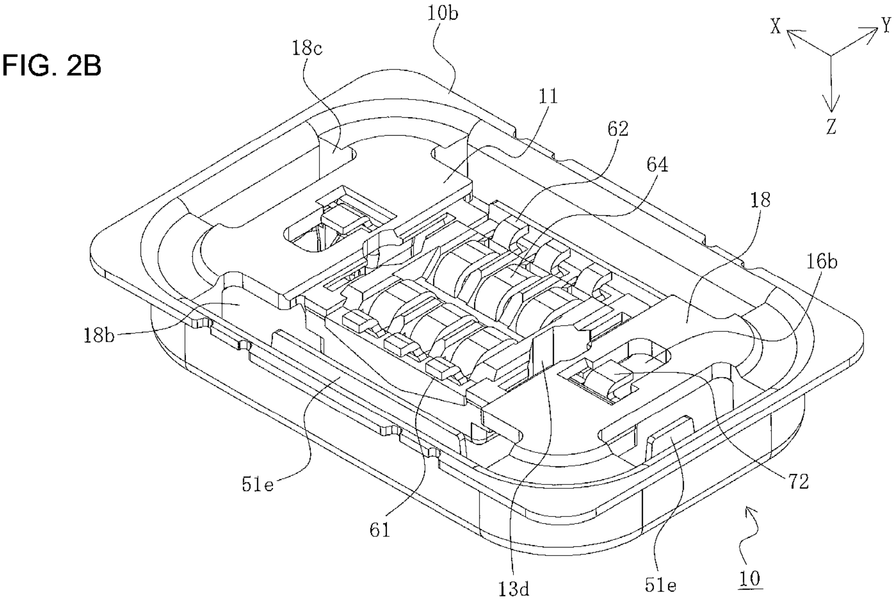
Figure 3:
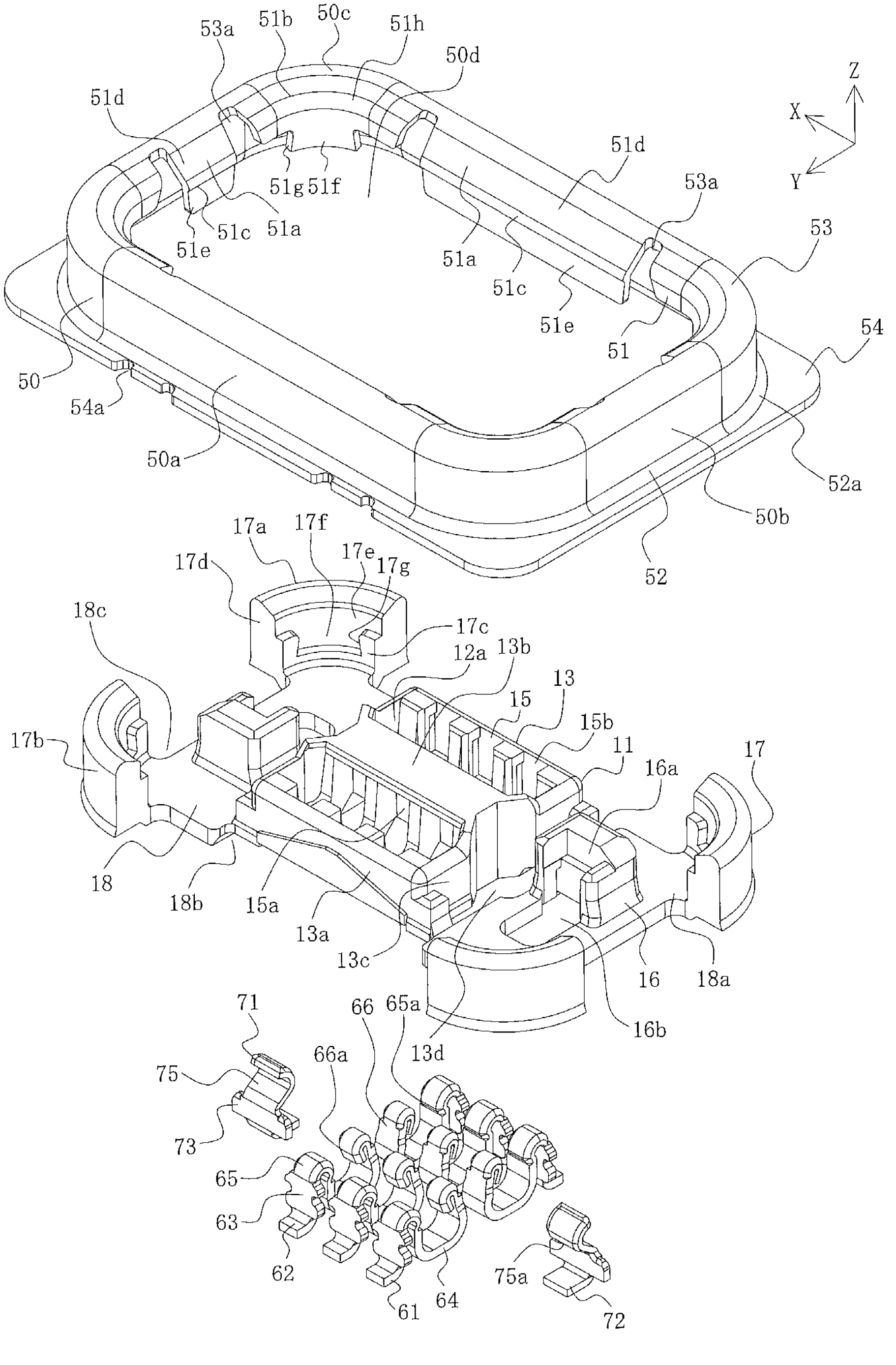
FIG. 3 is an exploded view of the first connector according to Embodiment 1.
Figures 4A, 4B, 4C:
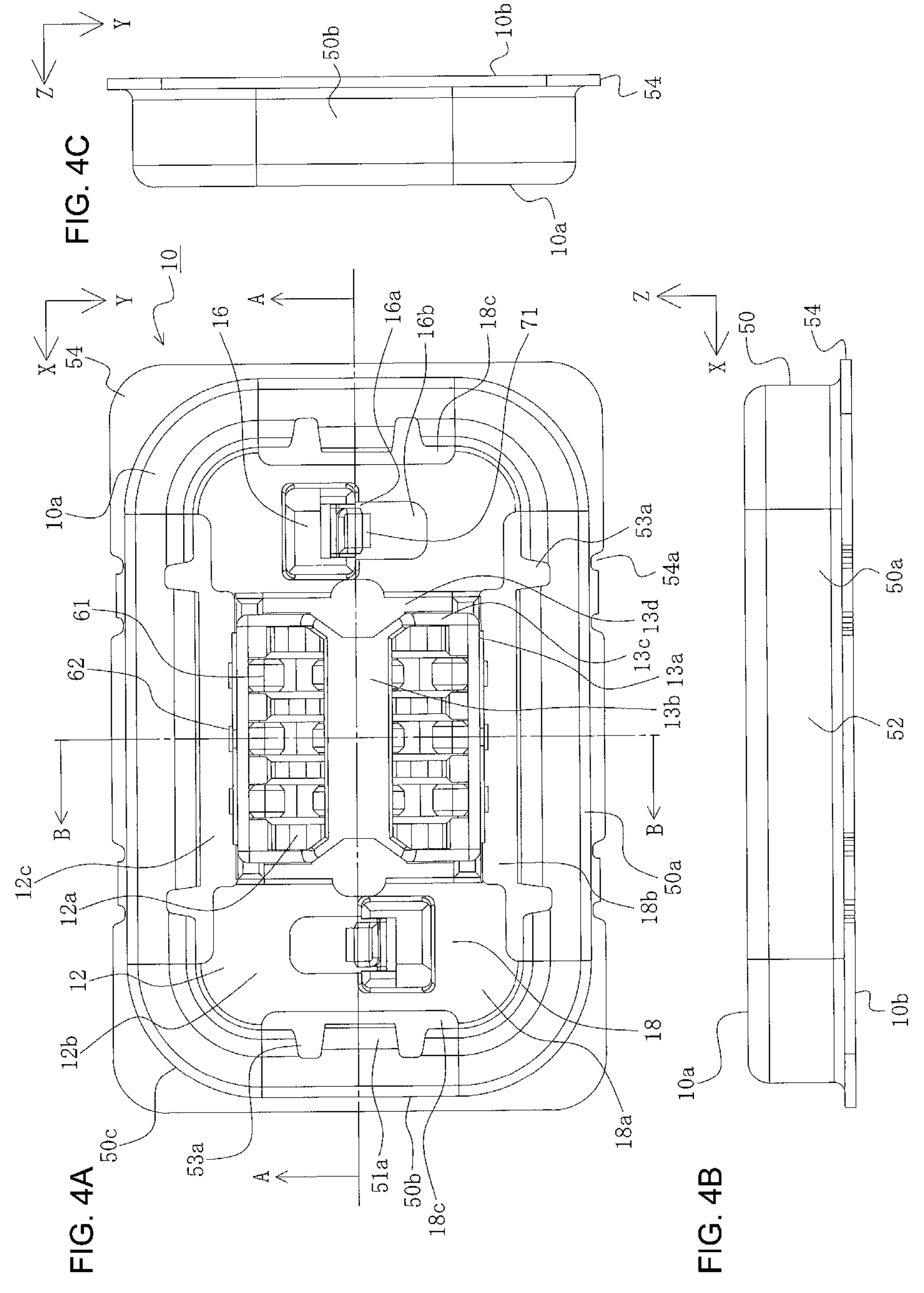
FIGS. 4A-4C are three views of the first connector according to Embodiment 1, where
Figure 5:
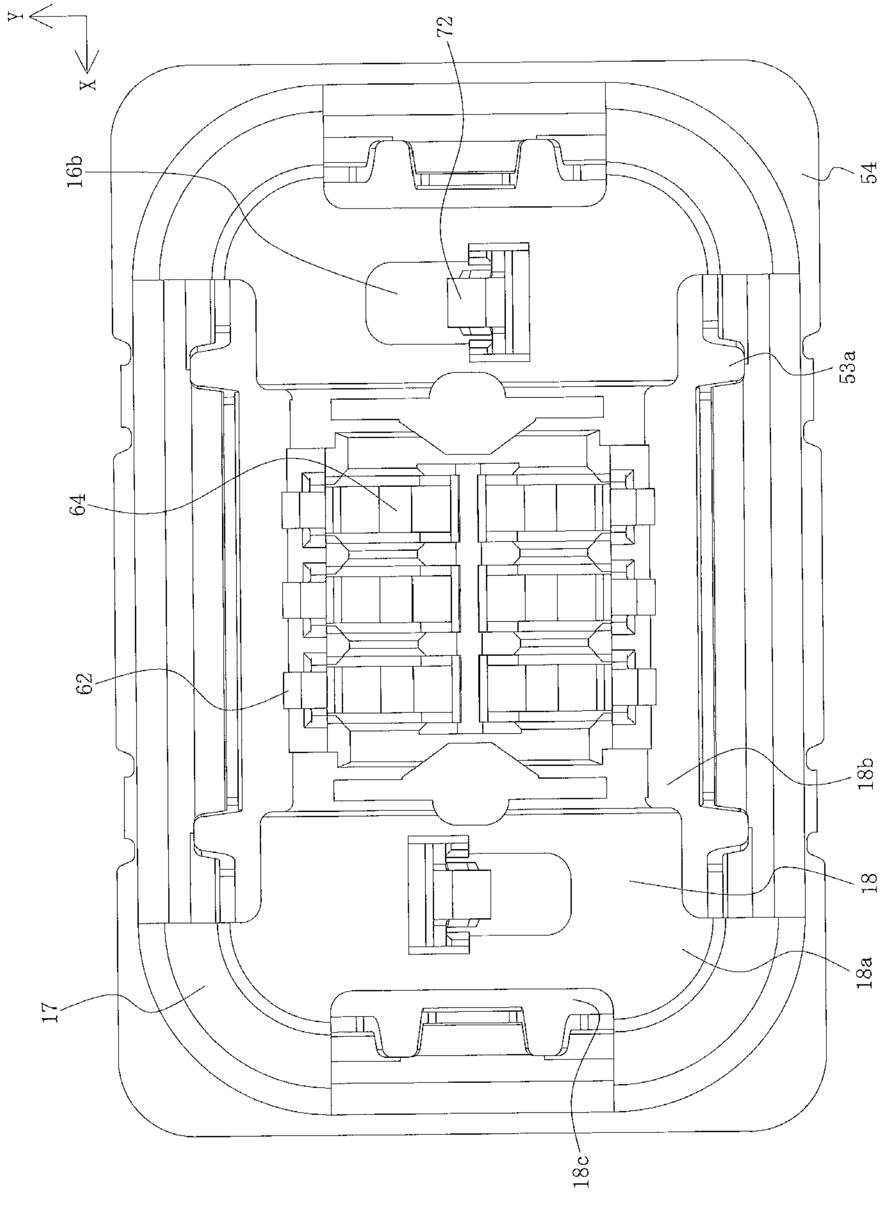
FIG. 5 is a lower surface view illustrating the first connector according to Embodiment 1.
Figure 6A:
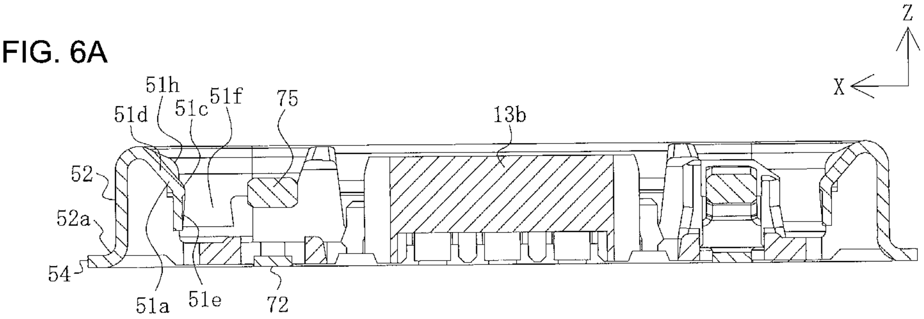
FIGS. 6A and 6B are cross-sectional views of the first connector according to Embodiment 1, where
Figure 6B:
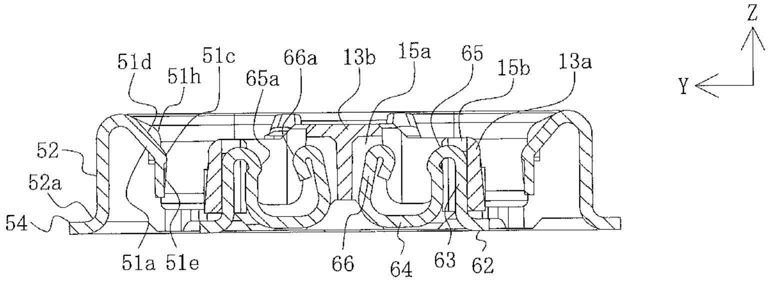

FIG. 1 is a perspective view prior to mating of the first connector and the second connector according to Embodiment 1; FIGS. 2A and 2B are perspective views of the first connector according to Embodiment 1; FIG. 3 is an exploded view of the first connector according to Embodiment 1; FIGS. 4A-4C are three surface views of the first connector according to Embodiment 1; FIG. 5 is a lower surface view of the first connector according to Embodiment 1; and FIGS. 6A and 6B are cross-sectional views of the first connector according to Embodiment 1. Note that FIG. 2A is an obliquely upward view, and FIG. 2B is an obliquely downward view, and FIG. 4A is a top surface view, FIG. 4B is a side surface view, and FIG. 4C is a front surface view. FIG. 6A is cross-sectional view along line A-A in FIG. 4A, and FIG. 6B is a cross-sectional view along line B-B in FIG. 4A.

In the drawings, 10 is a connector of the present Embodiment and represents a first connector as one of a pair of board to board connectors that are a connector pair. The first connector 10 is a surface mounting type receptacle connector mounted on a surface of a first board that is a board (not shown) serving as a mounting member and is mated together with a second connector 101 serving as a counterpart connector. Furthermore, the second connector 101 is the other of the pair of substrate-to-substrate connectors and is a surface mounting type plug connector mounted on a surface of a second substrate (not shown) serving as a mounting member.

Note that the first connector 10 and the second connector 101 of the connector pair according to the present Embodiment are preferably used to electrically connect the first substrate to the second substrate but can also be used to electrically connect other members. For example, the first substrate and the second substrate are each a printed circuit board, a flexible flat cable (FFC), a flexible circuit board (FPC), or the like as used in electronic devices or the like, but may be any type of substrate.

Furthermore, in the present Embodiment, expressions indicating direction such as up, down, left, right, front, rear, and the like used to describe a configuration and operation of each part of the connector pair first connector 10 and the second connector 101 are relative rather than absolute and are appropriate when each part of the first connector 10 and the second connector 101 are in positions illustrated in the drawings. However, these directions should be interpreted as changing in accordance with a change in position when the position thereof is changed.

Furthermore, the first connector 10 has: a first shield 50 as a first outer side shield, which is a receptacle shield formed by punching, drawing, or the like on a conductive metal plate; and a first housing 11 as a first connector main body integrally formed by an insulating material such as a synthetic resin or the like. The first housing 11 has a flat bottom plate 18, a first protruding part 13 protruding as a part upward from an upper surface of the bottom plate 18, and corner parts 17 protruding upward from four corners of the bottom plate 18.

The corner part 17 is a portion that is connected to the first shield 50 when the first shield 50 is integrated with the first housing 11 by overmolding or insert molding. In other words, the first housing 11 is molded by filling a cavity of a mold in which the first shield 50 is internally set in advance, with an insulating material such as synthetic resin or the like, and is integrally connected to the first shield 50 at the corner part 17. Therefore, the first housing 11 and the first shield 50 do not exist separately, but in FIG. 3, for convenience of description, the first housing 11 and the first shield 50 are shown as if they exist separately.

As shown in FIG. 3, each of the corner parts 17 includes: an upper wall part 17*a* shaped like one of four sections of a cylindrical wall, having an arc shape with a central angle of approximately 90 degrees in plan view; a cylindrical outer wall part 17*b* extending downward (in the negative direction of the Z-axis) from the outer edge of the upper wall part 17*a*; a cylindrical inner wall part 17*c* extending downward from the inner edge of the upper wall part 17*a*; and a pair of flat side wall parts 17*d* extending downward from the edge of the upper wall 17*a* corresponding to the two ends of an arc with a central angle of approximately 90 degrees. Furthermore, the inner wall part 17*c* has a shield housing part 17*e* recessed to store the inner wall 51 at the corner part 50*c* of the first shield 50. The lower end part of the shield housing part 17*e* includes a fan-shaped part 17*f* that becomes wider going downward. Both sides of the fan-shaped part 17*f* have oblique side surfaces 17*g* as locking surfaces, where the interval between both sides becomes wider moving downward. Furthermore, the lower end of the inner wall part 17*c* is connected to the tip end of the connecting part 18*a* extending outward at each of the four corners of the bottom plate 18.

The first protruding part 13 is an essentially rectangular-shaped member extending in the longitudinal direction (X-axis direction) of the first connector 10, and includes a pair of outer side protruding parts 13*a* extending in the longitudinal direction of the first connector 10 on both sides in the width direction (Y-axis direction) of the first connector 10, a pair of inner side protruding parts 13*b* extending in the longitudinal direction of the first connector 10 at the center in the width direction, and a pair of transverse protruding parts 13*c* that connect the two ends of the outer side protruding parts 13*a* and the inner side protruding parts 13*b* in the longitudinal direction. Furthermore, a pair of inner recessed groove parts 12*a*, which are recessed parts extending in the longitudinal direction of the first connector 10, are formed as a portion of the first recessed part 12 between the outer side protruding parts 13*a* on both sides to the left and right of the inner side protruding part 13*b*.

Here, a first signal terminal housing cavity 15 is formed from both left and right side surfaces of the inner side protruding part 13*b*, along the bottom surface of the inner recessed groove part 12*a*, and to the side surface of the outer side protruding part 13*a*. In the illustrated example, the first signal terminal housing cavities 15 pass through the bottom plate 18 in the plate-thickness direction (Z-axis direction). Note that, of the first signal terminal housing cavities 15, recessed groove parts formed on both side surfaces on the left and right of the inner side protruding part 13*b* are referred to as a first signal terminal housing inner side cavity 15*a*, and recessed groove parts formed on side surfaces facing the inner side protruding part 13*b* at the outer side protruding part 13*a* are referred to as a first signal terminal housing outer side cavity 15*b*.

A plurality (three in the example illustrated in the figure) of the first signal terminal housing cavities 15 are formed at a prescribed (for example, 0.35 [mm]) pitch in a longitudinal direction. Note that the pitch and the number of the first signal terminal housing cavities 15 can be changed as appropriate. A plurality of first terminals 61, which are terminals housed in each of the first signal terminal housing cavities 15 and attached to the first housing 11, are also provided at a similar pitch on both the sides of the first protruding part 13. In other words, a plurality of first terminals 61 are provided along each inner recessed groove part 12*a* to form a pair of parallel terminal group rows.

Furthermore, second shield housing slits 13*d* are formed as slits into which enters an inner wall 151, described later, of the second shield 150 of the second connector 101 on the outer side of both ends in the longitudinal direction of the first protruding part 13, or in other words, on the outside of the lateral protruding part 13*c*. In the example shown in the figure, the second shield housing slit 13*d* is formed to penetrate the bottom plate 18 in the direction of the plate thickness, but the slit does not necessarily penetrate the bottom plate 18 in the direction of the plate thickness.

A side recessed part 18*b* is formed in the bottom plate 18 on the outer side of the first protruding part 13 in the width direction of the first connector 10, and as a result, the bottom plate 18 has a smaller dimension in the width direction of the first connector 10, or in other words, is formed to a narrow width. In addition, end recessed parts 18*c* are formed at both ends of the bottom plate 18 in the longitudinal direction of the first connector 10, and therefore, the bottom plate 18 has a small dimension in the longitudinal direction of the first connector 10, or in other words, is formed to be short.

Furthermore, first high-frequency terminal supporting parts 16 serving as a pair of supporting parts protruding upwardly from the upper surface of the bottom plate 18 are formed more on an outer side of the first protruding part 13 with regard to the longitudinal direction of the first connector 10. The first high-frequency terminal supporting parts 16 have a shape when viewed from above that is an essentially U-shaped columnar member as illustrated in FIG. 4A and have a first high-frequency terminal stowing groove 16*a* serving as a high-frequency terminal stowing groove extending in the vertical direction. In addition, the first high-frequency terminal supporting parts 16 are disposed such that openings of the respective first high-frequency terminal stowing grooves 16*a* face opposite directions and, as illustrated in FIG. 4A, are disposed so as to be point-symmetrical with regard to a center of the first connector 10 when viewed from above, in other words, in plan view, and so as to be separated from the center of the first connector 10 in the width direction and deflected to an outer side in the width direction. Furthermore, a first high-frequency terminal 71 serving as a high-frequency terminal is stowed in the first high-frequency terminal stowing grooves 16*a*. Furthermore, first high-frequency terminal stowing openings 16*b* serving as an opening penetrating the bottom plate 18 in the plate thickness direction is formed below and in front of the first high-frequency terminal stowing grooves 16*a*.

The first shield 50 is a member integrally formed by punching, drawing, or the like on a conductive metal plate, and as illustrated in FIG. 4A, is an essentially rectangular frame shaped member when viewed from above, in other words, in plan view, which surrounds an entire circumference of the first housing 11. Furthermore, the first shield 50 includes an oblique surface part 51*d* and a gradual oblique surface part 51*h* as oblique parts extending obliquely downward and formed on the inner peripheral edge of the upper end thereof. Furthermore, the first shield 50 includes a plurality of (one pair in the example shown in the figure) long side parts 50*a* as linear parts extending linearly in the longitudinal direction of the first connector 10, a plurality of (one pair in the example shown in the figure) short side parts 50*b* as linear parts extending linearly in the width direction of the first connector 10, and a plurality (four in the example shown in the figure) of corner parts 50*c* as curved parts that are curved by approximately 90 degrees that connect one end of the long side part 50*a* and one end of the short side part 50*b*.

Furthermore, the first shield 50 contains: an outer wall 52; an inner wall 51 essentially parallel to the outer wall 52 on an inner side of the outer wall 52; and a coupling part 53 that connects and integrates an upper end of the outer wall 52 with an upper end of the inner wall 51. While the outer wall 52 is a wall that is contiguous over the entire circumference, the inner wall 51 has slits 53 a formed near the corner parts 50*c* of the long side parts 50*a* and the short side parts 50*b* such that a mating spring part 51*a* and a mating positioning part 51*b* are separated. Note that an enclosed space surrounded on the circumference by the portions corresponding to the long side part 50*a*, the short side part 50*b* and the corner part 50*c* of the inner wall 51 is a housing part 50*d* in which the second connector 101, which is a plug connector, is inserted and stowed.

The mating spring part 51*a* is a portion extending linearly within the range of each long side part 50*a* and within the range of each short side part 50*b*, and when the first connector 10 and the second connector 101 are in a mated state, the mating spring part elastically contacts the outer wall 152 of the second shield 150 of the second connector 101 and functions as a ground spring that maintains the conductive state between the first shield 50 and the second shield 150. Furthermore, the mating positioning part 51*b* is a portion where a portion of the long side part 50*a* and a portion of the short side part 50*b* are connected to both sides of the curved corner part 50*c*, and when the first connector 10 and the second connector 101 are mated, guides the second connector 101 that is inserted into the housing part 50*d*. Specifically, the second connector 101 is inserted into the housing part 50*d* while the outer wall 152 of the second shield 150 is in contact with the mating positioning part 51*b*, thereby positioning is performed between the second connector 101 and the first connector 10.

Furthermore, the upper end of the mating spring part 51*a* is connected to the lower end of the connecting part 53, and contains the oblique surface part 51*d* that extends obliquely downward to the inside of the housing part 50*d*, an engaging protruding part 51*c* formed on a lower end of the oblique surface part 51*d* and protruding to the inside of the housing part 50*d*, and an inner wall lower part 51*e* extending substantially vertically downward from the lower end of the engaging protruding part 51*c*. Furthermore, the engaging protruding part 51*c* is a portion that engages with an engaging protrusion 152*c* formed on an outer wall 152 of a second shield 150 of the second connector 101 when the first connector 10 and the second connector 101 are in a mated state and extends linearly in the longitudinal or width direction of the first connector 10. The mating spring parts 51*a* are not connected to the first housing 11, but are relatively flexible and can be elastically deformed in a direction of approaching or separating from the outer wall 52, since both ends are separated from another portion by the slit part 53*a*.

The vicinity of the upper end of the mating positioning part 51*b* is a connecting portion of the upper end of the inner wall 51 on the connecting part 53, and forms the gradual oblique surface part 51*h* that slopes gradually downward toward the inside of the housing part 50*d*. Therefore, as illustrated in FIGS. 6A and 6B, when viewed in the longitudinal direction and width direction of the first connector 10, the oblique angle of the gradual oblique surface part 51*h*, or in other words, the taper angle, is more gentle than the taper angle of the mating spring part 51*a* oblique surface part 51*d*, and when the first connector 10 and the second connector 101 are mated together, the gradual oblique surface part 51*h* contacts the second connector 101 that is inserted into the housing part 50*d*, and subsequently, the oblique surface part 51*d* makes contact. Thereby, the damage to the mating spring part 51*a* can be reduced when the first connector 10 and the second connector 101 are mated.

In addition, a corner part 50*c* included in the mating positioning part 51*b* is a portion that is connected to the first housing 11 when the first shield 50 is integrated with the first housing 11 by overmolding or insert molding, and specifically, is a portion that is integrated with the corner part 17. Note that the other portions in the first shield 50 are separated from the first housing 11. Therefore, when the first shield 50 and the first housing 11 are integrated, the outer wall 52 and the connecting part 53 at the corner part 50*c* cover the outer wall part 17*b* and the upper wall part 17*a* at the corner part 17. Furthermore, the inner wall 51 at the corner part 50*c* is housed within the shield housing part 17*e* formed in the inner wall part 17*c* at the corner part 17. Furthermore, a fan-shaped part 51*f* is included at the lower end part of the inner wall 51 where the fan-shaped part 51*f* gets wider going downward and is housed in the fan-shaped part 17*f* of the shield housing part 17*e*. An oblique side surface 51g having mutual spacing with the fan-shaped part 51*f* that widens moving downward faces and locks with the oblique side surface 17*g* of the fan-shaped part 17*f*.

This ensures that the corner part 50*c* and corner part 17 are firmly integrated and cannot be separated. Furthermore, the corner part 50*c* is integrated with the corner part 17 of the first housing 11, and at least the space demarcated by the outer wall 52, the inner wall 51, and the connecting part 53 is filled with an insulating material that constitutes the first housing 11. In other words, the corner part 50*c* is robust because the backside is filled with the constituent material of the first housing 11. Furthermore, the mating positioning part 51*b* including the corner part 50*c* has high robustness, and therefore, even if the portion near the mating surface 101*a* of the second shield 150 of the second connector 101, which will be described later, comes into contact with the mating positioning part 51*b*, the mating positioning part 51*b* will not be deformed or damaged.

A flange part 54 serving as an outwardly extending flat part is connected to the lower end of the outer wall 52 through the bent part 52*a* bent at an angle of approximately 90 degrees. The bent part 52*a* and the flange part 54 are connected to the lower end of the outer wall 52 in a continuous manner around the entire circumference. Note that in the example illustrated in the drawings, a small notch 54*a* is formed in a plurality of locations on the flange part 54, but the notch 54*a* can be omitted as appropriate.

The flange part 54 functions as a substrate connecting part, a lower surface of which is parallel to the surface of the first substrate and is a portion connected by soldering or the like to the connection pad on the surface. The connection pad is typically connected to a ground line. Furthermore, the outer wall 52, in addition to being a continuous wall over the entire circumference itself, is connected to a portion where an upper end thereof is continuous at the coupling part 53, which is a portion at a location extending in a direction orthogonal to the outer wall 52 in a cross section as illustrated in FIGS. 6(*a*) and (*b*) and is connected to a member where a lower end thereof is continuous as with the flange part 54, which is a member extending in a direction orthogonal to the outer wall 52 in the cross section as illustrated in FIGS. 6A and 6B. Therefore, the outer wall 52 is relatively rigid and resistant to deformation. In the present Embodiment, an example is described where the flange part 54 is connected to the lower end of the outer wall 52 continuously over the entire circumference, but the flange part 54 may be connected only to a portion if relatively high rigidity is not required.

Furthermore, when the first housing 11 is connected to the first shield 50 in the stowing part 50*d*, a first recess 12 that mates with the second connector 101 is formed in the stowing part 50*d*, which is a recess with a circumference surrounded by the inner wall 51 and a lower portion is demarcated by the bottom plate 18. Furthermore, as described above, the inner recessed groove parts 12*a* which are long narrow recessed parts extending in the longitudinal direction of the first connector 10 are formed as a portion of the first recessed part 12, between the outer side protruding parts 13*a* on both sides to the left and right of the inner side protruding part 13*b*. Furthermore, an outer recessed groove part 12*c*, which is an elongated recessed part extending in the longitudinal direction of the first connector 10, is formed between the outer side protruding parts 13*a* and the inner wall 51 as a portion of the first recessed part 12. Furthermore, mating recesses 12*b* are formed at two outer ends of the first protruding part 13 with regard to the longitudinal direction of the first connector 10 as a portion of the first recessed part 12.

Furthermore, the first terminal 61 is a member integrally formed by punching, bending, or the like on a conductive metal plate, and is provided with the retained part 63, the tail part 62 serving as a substrate connecting part connected to a lower end of the retained part 63, an outer side connecting part 65 connected to an upper end of the retained part 63, and a lower side connecting part 64 connected to a lower end of the outer side connecting part 65 having an essentially U-shaped side surface shape. The contacting part 65*a* curved so as to swell inward in the width direction of the first connector 10 is formed in the vicinity of the lower end of the outer side connecting part 65. Furthermore, the first terminal 61 is further provided with an inner side connecting part 66 connected to a tip end of the lower side connecting part 64. The inner side connecting part 66 is bent and connected to the lower side connecting part 64, and extends upwardly (Z-axis positive direction). A contacting part 66*a* curved so as to bulge outwardly in the width direction of the first connector 10 is formed in the vicinity of an upper end of the inner side connecting part 66. The contact part 66*a* is similar to the contacting part 65*a* of the outer side connecting part 65, and is the portion that contacts the second terminal 161 provided in the second connector 101. In other words, the first terminal 61 in the present Embodiment is provided with the contacting part 65*a* of the outer side connecting part 65 and the contacting part 66*a* of the inner side connecting part 66, which face each other, and is configured to make two-point contact with the second terminal 161. When the first terminal 61 is mounted in the first housing 11, the contacting part 65*a* of the outer side connecting part 65 and the contact part 66*a* of the inner side connecting part 66 protrude into the inner recessed groove part 12*a* so as to be facing each other.

Furthermore, the first terminal 61 is press-fitted into the first signal terminal housing cavity 15 from a mounting surface 10*b* side, which is a lower surface (Z-axis negative direction surface) of the first connector 10, and is fixed to the first housing 11 based on the retained part 63 being sandwiched from two sides by the inner side surfaces of the first signal terminal housing outer side cavity 15*b*. Note that the first terminal 61 is not required to be attached to the first housing 11 by press fitting, but may be integrated with the first housing 11 by overmolding or insert molding. Here, for convenience of description, a case in which the retained part 63 is pressed into and retained by the first signal terminal housing outer side cavity 15*b* will be described.

The tail part 62 is bent and connected to the retained part 63, extends in a left-right direction (Y-axis direction), in other words, outward in the width direction of the first connector 10, and is connected to the connection pad connected to a conductive trace of the first substrate by soldering or the like. Note that the conductive trace may be a power line that supplies power, but is typically a signal line. Furthermore, the signal line is described assuming that the signal line does not transmit a high-frequency signal but rather transmits a signal of normal frequency (for example, frequency less than 10 [GHz]), which is lower in frequency than high-frequency signals. Note that the tail part 62 is visible when viewed from a mating direction of the first connector 10, in other words, from a mating surface 10*a* side.

The first high-frequency terminal 71 is a member integrally formed by punching, bending, or the like on a conductive metal plate, and has a retained part 73, a tail part 72 serving as a substrate connecting part connected to a lower end of the retained part 73, and an upper side connecting part 75 connected to an upper end of the retained part 73.

Furthermore, the retained part 73 extends in the vertical direction (Z-axis direction) and is a portion that is press-fitted and retained in the first high-frequency terminal stowing groove 16*a*. As described above, the first high-frequency terminal supporting parts 16 are disposed such that the openings of the respective first high-frequency terminal stowing grooves 16*a* face opposite directions, and therefore, the first high-frequency terminals 71 retained in the first high-frequency terminal stowing grooves 16*a* by the retained part 73 are also in a position so as to face each other in opposite directions. Note that the first high-frequency terminal 71 is not necessarily attached to the first housing 11 by press fitting but may be integrated with the first housing 11 by overmolding or insert molding. Herein, for convenience of description, a case in which the retained part 73 is pressed into and retained by the first high-frequency terminal stowing groove 16*a* will be described.

The tail part 72 is bent and connected to the retained part 73, extends in a left-right direction (Y-axis direction), in other words, toward the center in the width direction of the first connector 10, and is connected to the connection pad connected to a conductive trace of the first substrate by soldering or the like. Note that the aforementioned conductive traces are signal lines, which are typically described as transmitting high-frequency signals of high frequency (for example, frequency of 10 [GHz] or higher), such as RF signals.

Furthermore, the upper side connecting part 75 is bent in an approximate S-shape when viewed from the longitudinal direction of the first connector 10, and a portion bent so as to bulge out toward the center in the width direction of the first connector 10 functions as a contacting part 75*a*. The contacting part 75*a* is a portion that contacts a second high-frequency terminal 171 provided by the second connector 101.

The first high-frequency terminal 71 is press-fitted from the mounting surface 10*b* side into the first high-frequency terminal stowing groove 16*a* of the first high-frequency terminal supporting part 16 positioned in the mating recess 12*b* and is fixed to the first housing 11 based on the retained part 73 being sandwiched from two sides by inner side surfaces of the first high-frequency terminal stowing groove 16*a*. In this state, in other words, in a state in which the first high-frequency terminals 71 are installed in the first housing 11, the contacting parts 75*a* of the pair of first high-frequency terminals 71 face mutually opposite directions.

Furthermore, the first connector 10 is placed on the surface of the first substrate with a first solder sheet (not shown) serving as a solder sheet applied to the mounting surface 10*b* side and is fixed and mounted on the surface of the first substrate by heating and melting the first solder sheet using a heating furnace or the like. Note that means for connecting the first shield 50, the first terminal 61, the first high-frequency terminal 71, and the like to the connection pad of the first substrate and the like are not necessarily limited to soldering and may be, for example, conductive adhesive or the like. Moreover, even with soldering, soldering may be performed not by applying a solder sheet but by applying a solder paste, transferring cream solder, hot-dip galvanizing, jet soldering, or the like. Herein, for convenience of description, a case where a solder sheet is used will be described.

The first solder sheet contains: a pair of elongated strip shaped long side portions extending linearly and continuously in the longitudinal direction of the first connector 10; a pair of elongated strip shaped short side portions extending linearly and continuously in the width direction of the first connector 10; and a plurality of rectangular short length portions in which a long side extends in the width direction of the first connector 10 and a short side extends in the longitudinal direction of the first connector 10. Note that two ends of each short side portion are preferably connected to the long side portions. Furthermore, the long side portion and short side portion do not necessarily have to extend continuously and may be intermittent but will be described herein as extending continuously.

Furthermore, a pair of long side portions are attached to the bottom surface of the flange part 54 corresponding to the long side parts 50*a* of the first shield 50. A pair of short side portions are attached to the bottom surface of the flange part 54 corresponding to the short side parts 50*b* of the first shield 50. Furthermore, each short length portion is provided on a lower surface of the tail part 62 of each first terminal 61 and to a lower surface of the tail part 72 of each first high-frequency terminal 71.

When the first solder sheet provided in this manner is heated and melted and the first connector 10 is mounted on the surface of the first substrate, the bent part 52*a* and the flange part 54, which are continuously connected over the entire circumference to the lower end of the outer wall 52 that is continuous over the entire circumference of the first shield 50, are connected to the connection pads on the surface of the first substrate without a gap. Therefore, the strength of the first shield 50 connected to the connection pads on the surface of the first substrate is high, and consequently, the strength of the entire first connector 10 with an outer circumference surrounded by the first shield 50 is high. Furthermore, an electromagnetic shielding effect exerted by the first shield 50, which is connected without a gap to the connection pads on the surface of the first substrate, is very high, and the first connector 10 with an outer circumference surrounded by the first shield 50 is very effectively electromagnetically shielded. In particular, the smoothness of the lower surface of the flange part 54 is high. Thus, the strength of the first shield 50 connected to the connection pads on the surface of the first substrate can be made extremely high. Moreover, since no gap is created between the connection pads on the surface of the first substrate, the electromagnetic shielding effect can also be made extremely high.

Thus, the first connector 10 can transmit a high-frequency signal even with a compact and low profile, because the strength and the electromagnetic shielding effect are high. For example, even if the dimensions in the longitudinal, width, and height directions of the first connector 10 are set to 3.3 [mm] or less, 2.3 [mm] or less, and 0.7 [mm] or less, the first high-frequency terminal 71 can transmit a high-frequency signal of approximately 60 [GHz].

Next, the configuration of the second connector 101 will be described.

Figure 7A:
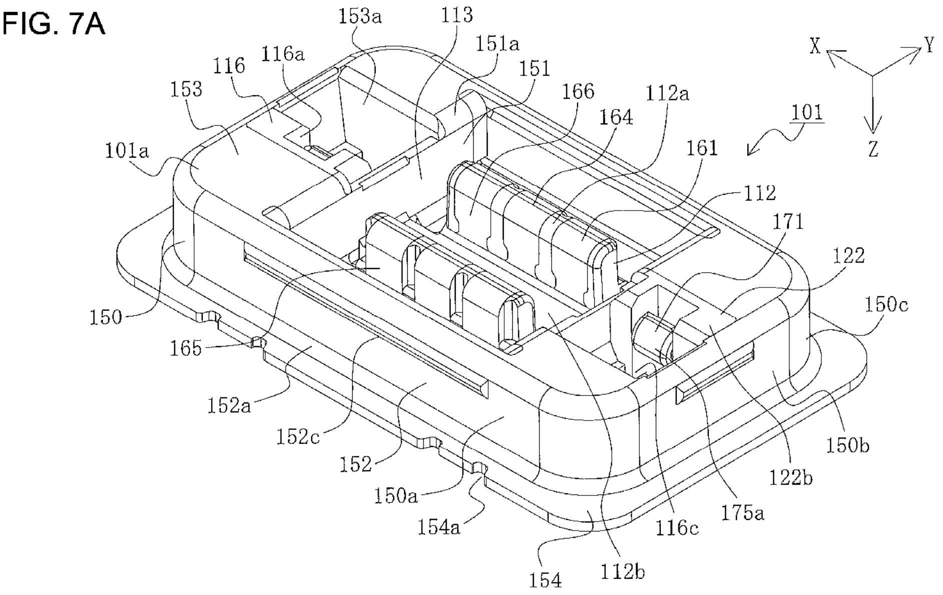
FIGS. 7A and 7B are perspective views illustrating a second connector of Embodiment 1, where
Figure 7B:
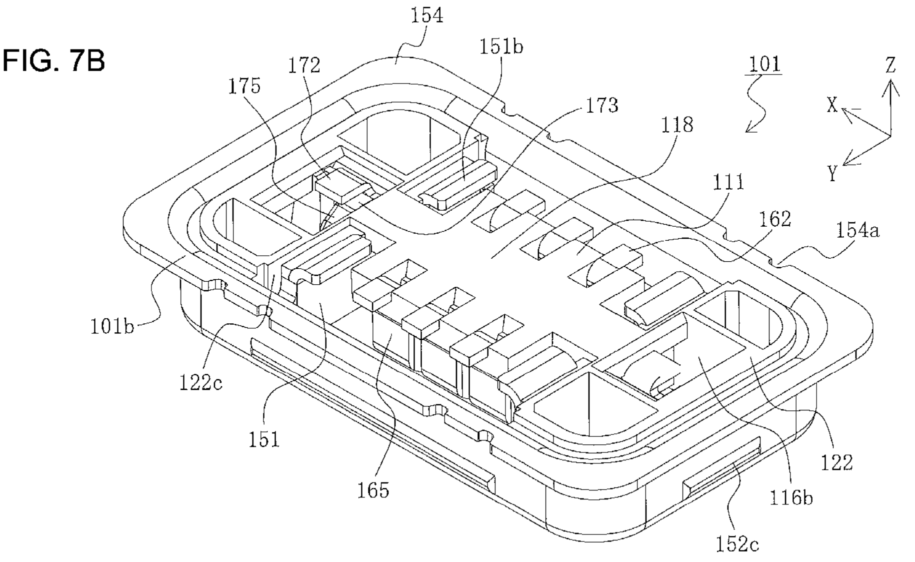
Figure 8C:
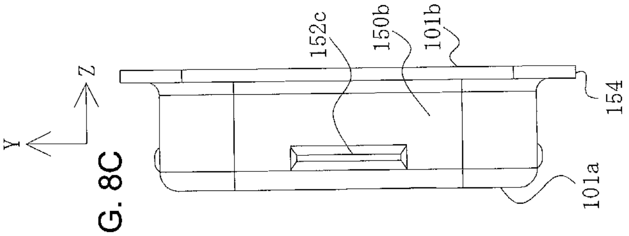
FIGS. 8A-8C are three views of the second connector according to Embodiment 1, where
Figure 8A:
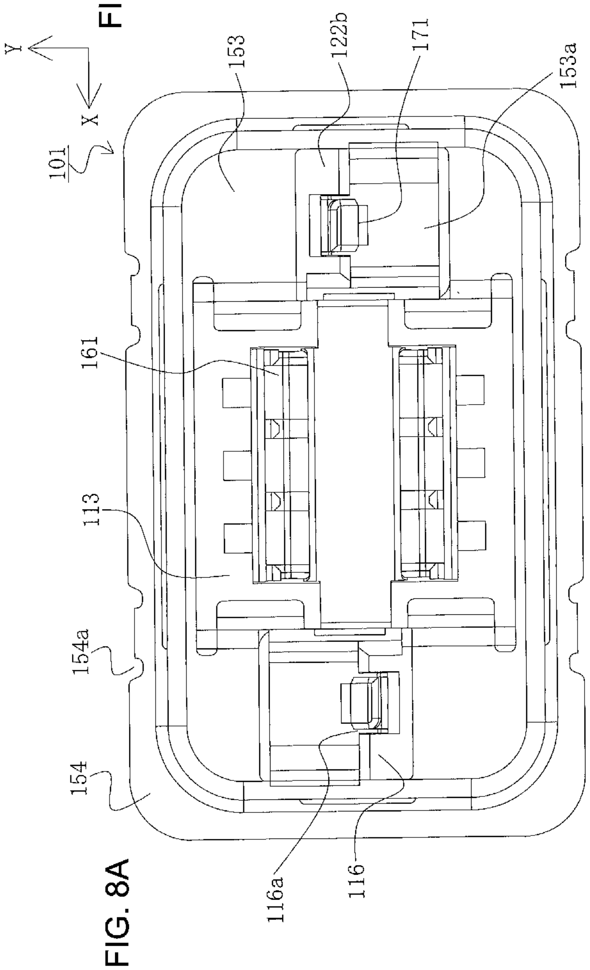
Figure 8B:
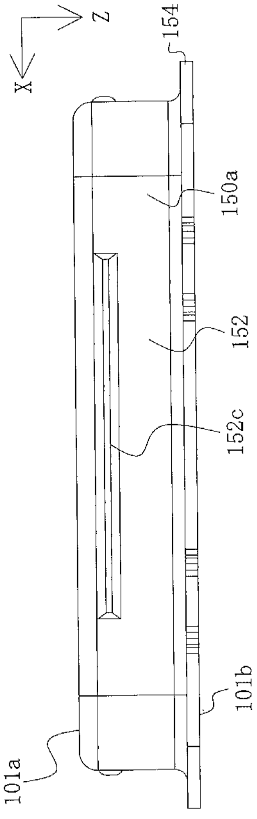
Figure 9:
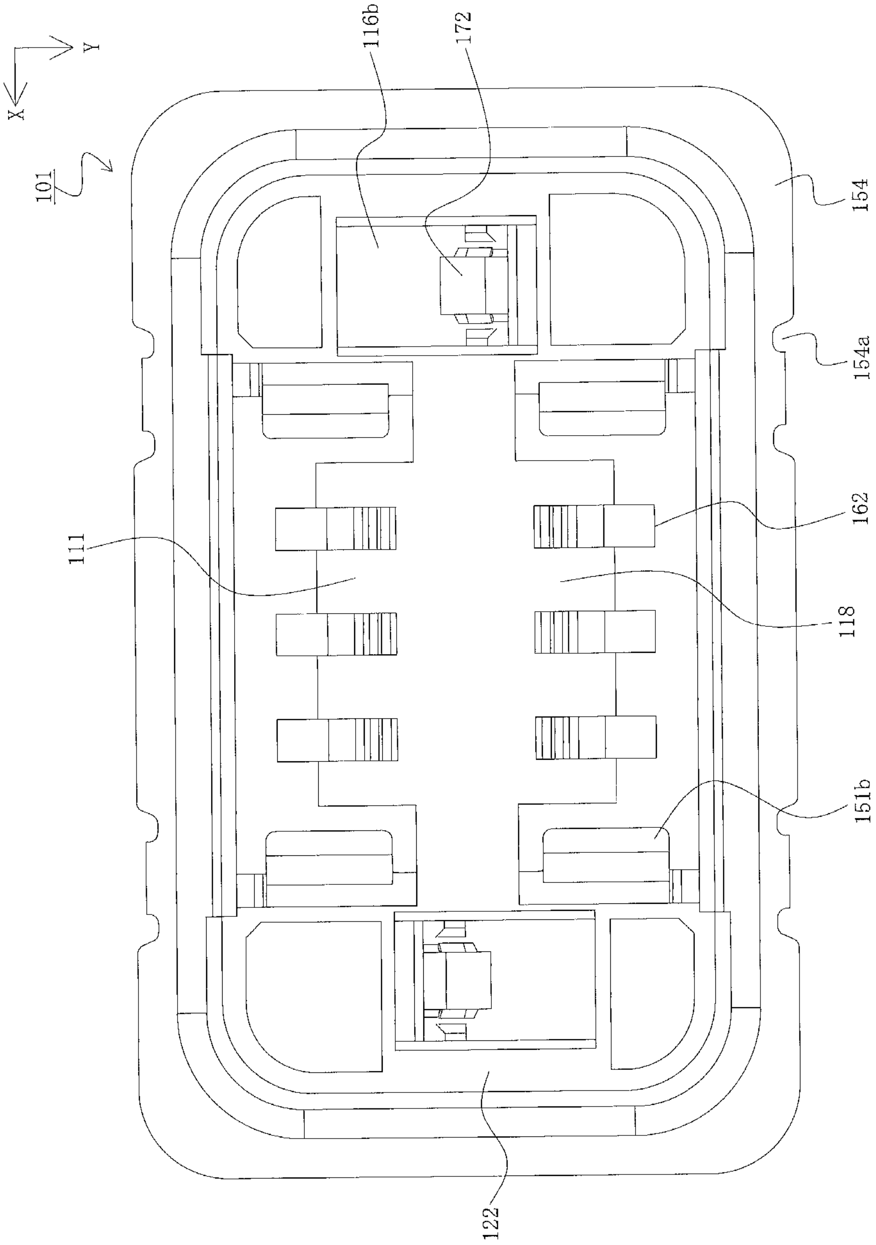
FIG. 9 is a lower surface view illustrating the second connector according to Embodiment 1.

FIGS. 7A and 7B are perspective views illustrating the second connector according to Embodiment 1, FIGS. 8A-8C are three surface views illustrating the second connector according to Embodiment 1, and FIG. 9 is a lower surface view of the second connector according to Embodiment 1. Note that FIG. 7A is a view seen obliquely from above, FIG. 7B is a view seen obliquely from below, and FIG. 8A is a plan view, FIG. 8B is a side view, and FIG. 8C is a front view.

The second connector 101 according to the present Embodiment has: a second shield 150 as a second outer side shield, which is a plug shield formed by punching, drawing, or the like on a conductive metal plate; and a second housing 111 as a second connector main body integrally formed by an insulating material such as a synthetic resin or the like. The second housing 111 has: a flat bottom plate 118; a second protrusion 112 serving as a protrusion protruding upwardly from an upper surface of the bottom plate 118 in a center in a longitudinal direction of the second connector 101; and a pair of protruding end parts 122 protruding upwardly from the upper surface of the bottom plate 118 at two ends in the longitudinal direction (X-axis direction) of the second connector 101. The second protrusion 112 is narrower than the protruding end part 122 and is positioned more on an inner side in a width direction (Y-axis direction) of the second connector 101 than two ends of the protruding end part 122.

The second protrusion 112 is an essentially rectangular member extending in the longitudinal direction of the second connector 101. A groove shaped center groove 112*b* recessed downwardly from an upper surface is formed in a center in the width direction, and portions on two sides on the left and right of the center groove 112*b* are terminal supporting walls 112*a* supporting the second terminal 161 serving as a mating terminal. The second terminals 161 are provided at a pitch corresponding to the first terminals 61 at a number corresponding to the first terminals such that at least a portion of the second terminals 161 are exposed on the surface of the terminal supporting wall 112*a*. In other words, a plurality of the second terminals 161 are disposed along each terminal supporting wall 112*a* to form a pair of parallel terminal group rows (mating terminal group rows).

Each protruding end part 122 contains: an outer wall surface that faces an outer side in the longitudinal direction and two sides in the width direction of the second connector 101; an upper surface 122*b* that faces the mating surface 101*a* side of the second connector 101; and an inner wall surface 122*c* that faces an inner side in the longitudinal direction of the second connector 101. Note that each of the protruding end parts 122 is separated from two ends in the longitudinal direction of the second protrusion 112. Furthermore, a second high-frequency terminal supporting part 116 serving as a supporting part is formed on each protruding end part 122. The second high-frequency terminal supporting part 116 has second high-frequency terminal stowing grooves 116*a* serving as a high-frequency terminal stowing groove extending in the vertical direction and has an essentially U-shaped shape when viewed from above. The second high-frequency terminal supporting parts 116 are disposed such that openings of the respective second high-frequency terminal stowing grooves 116*a* face opposite directions and, as illustrated in FIG. 8A, are disposed so as to be point-symmetrical with regard to a center of the second connector 101 when viewed from above, in other words, in a plan view, and so as to be separated from the center of the second connector 101 in the width direction and deflected to an outer side in the width direction. Furthermore, a second high-frequency terminal 171 serving as a high-frequency terminal is stowed in the second high-frequency terminal stowing grooves 116*a*. Furthermore, a second high-frequency terminal stowing opening 116*b* serving as an opening penetrating the bottom plate 118 in the plate thickness direction is formed below and in front of the second high-frequency terminal stowing grooves 116*a*. Furthermore, on each of the protruding end parts 122, a first high-frequency terminal stowing recess 116*c*, serving as a mating terminal stowing recess opened in an upper surface 122*b* from the second high-frequency terminal stowing opening 116*b* to the upper surface 122*b*, is formed in front of the second high-frequency terminal stowing grooves 116*a*.

The second shield 150 is a member integrally formed by punching, drawing, or the like on a conductive metal plate and is an essentially rectangular frame shaped member in plan view, which surrounds an entire circumference of the second housing 111. Furthermore, the second shield 150 contains: a pair of long side parts 150*a* extending linearly in the longitudinal direction of the second connector 101; a pair of short side parts 150*b* extending linearly in the width direction of the second connector 101; and four corner parts 150*c* bent approximately 90 degrees connecting one end of the long side part 150*a* and one end of the short side part 150*b*.

Furthermore, the second shield 150 contains: an outer wall 152; an inner wall 151 serving as a second inner second inner side shield; and an upper wall 153. Furthermore, the outer wall 152 is a continuous wall over an entire circumference. Furthermore, the upper wall 153 is connected to an upper end of the outer wall 152 at each of the short side parts 150*b*, the corner parts 150*c* at two ends of the short side parts 150*b*, and in the vicinity of two ends of each of the long side parts 150*a* and is formed so as to cover at least a portion, preferably a majority, of the upper surface 122*b* of the protruding end part 122. Note that the first high-frequency terminal stowing opening 153*a* is formed in the upper wall 153, which serves as an opening corresponding to the first high-frequency terminal stowing recess 116*c*. Furthermore, the inner wall 151 extends downwardly with an upper end thereof connected to an inner side end in the longitudinal direction of the second connector 101 on the upper wall 153 and is formed so as to cover at least a portion, preferably essentially entirely, of the inner wall surface 122*c* of the protruding end part 122. Note that an upper end of the inner wall 151 has a bent upper wall connecting part 151*a* that is connected to the upper wall 153, and a lower end of the inner wall 151 has a tail part 151*b* serving as a substrate connecting part that is bent such that a tip end faces to an inner side in the longitudinal direction of the second connector 101. The tail part 151*b* is parallel to the surface of the second substrate and is a portion connected by soldering or the like to the connection pad on the surface. The connection pad is typically connected to a ground line. Furthermore, a space with a circumference surrounded by the outer wall 152 corresponding to the pair of long side parts 150*a* and the pair of inner walls 151 is a second recess 113 into which the first protruding part 13 of the first connector 10 is inserted and stowed.

A flange part 154 serving as a flat part is connected to the lower end of the outer wall 152 through the bent part 152*a* bent at an angle of approximately 90 degrees. The bent part 152*a* and the flange part 154 are connected to the lower end of the outer wall 152 in a continuous manner around the entire circumference. Note that in the example illustrated in the drawings, a small notch 154*a* is formed in a plurality of locations on the flange part 154, but the notch 154*a* can be omitted as appropriate.

The flange part 154 functions as a substrate connecting part, a lower surface of which is parallel to the surface of the second substrate and is a portion connected by soldering or the like to the connection pad on the surface. The connection pad is typically connected to a ground line. Furthermore, the outer wall 152, in addition to being a continuous wall over the entire circumference itself, is connected to a member where a lower end thereof is continuous as with the flange part 154, which is a member extending in a direction orthogonal to the outer wall 152 in the cross section. Therefore, the outer wall 152 is relatively rigid and resistant to deformation. In the present Embodiment, an example is described where the flange part 154 is connected to the lower end of the outer wall 152 continuously over the entire circumference, but the flange part 154 may be connected only to a portion if relatively high rigidity is not required.

Furthermore, the outer wall 152 corresponding to the long side part 150*a*, and the short side part 150*b* has the outwardly protruding engaging protrusion 152*c*. The engaging protrusion 152*c* is a portion that engages with the engaging protruding part 51*c* formed on the inner wall 51 of the first shield 50 provided by the first connector 10 when the first connector 10 and the second connector 101 are mated with each other and extends linearly in the longitudinal and width directions of the second connector 101.

Note that the second shield 150 is integrated with the second housing 111 by overmolding or insert molding. In other words, the second housing 111 is molded by filling a cavity of a mold in which the second shield 150 is internally set in advance, with an insulating material such as synthetic resin or the like, and is integrally connected to the second shield 150 at the protruding end part 122.

The second terminal 161 is a member integrally formed by punching, bending, or the like on a conductive metal plate, and has:

- an outer side connecting part 165 extending in the vertical direction (Z axis direction),
- a tail part 162 as a substrate connecting part connected to a lower end of the outer side connecting part 165,
- an upper side connecting part 164 connected to the upper end of the outer side connecting part 165, and
- an inner side connecting part 166 connected to the lower end of the upper side connecting part 164 and facing the outer side connecting part 165. The second terminals 161 may be integrated with the second housing 111 by over-molding or insert molding. That is, the second housing 111 is molded by filling a cavity of a mold in which the second terminals 161 are set in advance with an insulating material such as a synthetic resin.

As a result, the second terminal 161 is integrally attached to the terminal supporting wall 112*a* such that at least a portion thereof is embedded in the terminal supporting wall 112*a* of the second protrusion 112 in the second housing 111, and at least a portion of the surface of the outer side connecting part 165, the upper side connecting part 164, and the inner side connecting part 166 are exposed on an upper surface and inner side surface of the terminal supporting wall 112*a*. Note that the surfaces of the outer side connecting part 165 and the inner side connecting part 166 function as contacting parts, and contact the first terminal 61 that the first connector 10 is provided with. Furthermore, the tail part 162 extends to an outer side in the width direction of the second housing 111 from the terminal supporting wall 112*a* and is connected by soldering or the like to a connection pad connected to a conductive trace of the second substrate. The tail part 162 is disposed at a position overlapping the tail part 151*b* of the inner wall 151 when viewed from the longitudinal direction (X-axis direction) of the second connector 101. Note that the conductive trace may be a power line that supplies power, but is typically a signal line. Furthermore, the signal line is described assuming that the signal line does not transmit a high-frequency signal but rather transmits a signal of normal frequency (for example, frequency less than 10 [GHz]), which is lower in frequency than high-frequency signals.

Furthermore, the second terminal 161 is not necessarily integrated with the second housing 111 by overmolding or insert molding but may be attached to the second housing 111 by press fitting or the like. Herein, for convenience of description, a case of integrating with the second housing 111 by overmolding or insert molding will be described.

The second high-frequency terminal 171 is a member integrally formed by punching, bending, or the like on a conductive metal plate, and has: a retained part 173; a tail part 172 serving as a substrate connecting part connected to a lower end of the retained part 173; and an upper side connecting part 175 connected to an upper end of the retained part 173.

The retained part 173 extends in the vertical direction and is a portion that is press-fitted and retained in the second high-frequency terminal housing groove 116*a*. As described above, the second high-frequency terminal retaining parts 116 are arranged such that the openings of the second high-frequency terminal housing grooves 116*a* face in opposite directions, and therefore the second high-frequency terminals 171 with retainable parts 173 retained in the second high-frequency terminal housing grooves 116*a* are also oriented to face in opposite directions. Note that the second high-frequency terminal 171 is not necessarily attached to the second housing 111 by press fitting but may be integrated with the second housing 111 by overmolding or insert molding. Herein, for convenience of description, a case in which the retained part 173 is pressed into and retained by the second high-frequency terminal stowing grooves 116*a* will be described.

The tail part 172 is bent and connected to the retained part 173, extends in a left-right direction (Y-axis direction), in other words, toward the center in the width direction of the second connector 101, and is connected to the connection pad connected to a conductive trace of the second substrate by soldering or the like. Note that the aforementioned conductive traces are signal lines, which are typically described as transmitting high-frequency signals of high frequency (for example, frequency of 10 [GHz] or higher), such as RF signals.

Furthermore, the upper side connecting part 175 is bent in an approximate S-shape when viewed from the longitudinal direction of the second connector 101, and a portion bent so as to bulge out toward the center in the width direction of the second connector 101 functions as a contacting part 175*a*. The contacting part 175*a* is a portion that contacts a first high-frequency terminal 71 provided by the first connector 10.

The second high-frequency terminal 171 is press-fitted from a mounting surface 101*b* side into the second high-frequency terminal stowing grooves 116*a* of the second high-frequency terminal supporting part 116 positioned on the protruding end part 122 and is fixed to the second housing 111 based on the retained part 173 being sandwiched from two sides by inner side surfaces of the second high-frequency terminal stowing grooves 116*a*. In this state, in other words, in a state in which the second high-frequency terminals 171 are installed in the second housing 111, the contacting parts 175*a* of the pair of second high-frequency terminals 171 mutually face in opposite directions.

Note that in the example illustrated in the drawings, the second high-frequency terminal 171 is formed to have the same dimensions and shape as the first high-frequency terminal 71. Therefore, the first high-frequency terminal 71 can be used as the second high-frequency terminal 171.

Furthermore, the second connector 101 is placed on the surface of the second substrate with a second solder sheet (not shown) serving as a solder sheet applied to the mounting surface 101*b* side and is fixed and mounted on the surface of the second substrate by heating and melting the second solder sheet using a heating furnace or the like. Note that means for connecting the second shield 150, the second terminal 161, the second high-frequency terminal 171, and the like to the connection pad of the second substrate and the like is not necessarily limited to soldering and may be, for example, conductive adhesive or the like. Moreover, even with soldering, soldering may be performed not by applying a solder sheet but by applying a solder paste, transferring cream solder, hot-dip galvanizing, jet soldering, or the like. Herein, for convenience of description, a case where a second solder sheet is used will be described.

The second solder sheet contains: a pair of elongated strip shaped long side portions extending linearly and continuously in the longitudinal direction of the second connector 101; a plurality of elongated strip shaped short side portions extending linearly and continuously in the width direction of the second connector 101; and a plurality of rectangular short length portions in which a long side extends in the width direction of the second connector 101 and a short side extends in the longitudinal direction of the second connector 101. Note that two ends of each short side portion are preferably connected to the long side portions. Furthermore, the long side portion and short side portion do not necessarily have to extend continuously and may be intermittent but will be described herein as extending continuously.

Furthermore, a pair of long side portions are provided on a lower surface of the flange part 154 corresponding to the long side parts 150*a* of the second shield 150, a pair of short side portions are provided on the lower surface of the flange part 154 corresponding to the short side part 150*b* of the second shield 150, and another pair of short side portions are provided on a lower surface of the tail part 151*b* of the inner wall 151. Furthermore, each short length portion is provided on a lower surface of the tail part 162 of each second terminal 161 and to a lower surface of the tail part 172 of each second high-frequency terminal 171.

When the second solder sheet provided in this manner is heated and melted, and the second connector 101 is mounted on the surface of the second substrate, the bent part 152*a* and the flange part 154, which are continuously connected over an entire circumference to the lower end of the outer wall 152 that is continuous over the entire circumference in the second shield 150, are connected to the connection pads on the surface of the second substrate without a gap. Therefore, the strength of the second shield 150 connected to the connection pads on the surface of the second substrate is high, and consequently, the strength of the entire second connector 101 with an outer circumference surrounded by the second shield 150 is high. Furthermore, an electromagnetic shielding effect exerted by the second shield 150, which is connected without a gap to the connection pads on the surface of the second substrate, is very high, and the second connector 101 with an outer circumference surrounded by the second shield 150 is very effectively electromagnetically shielded. In particular, the smoothness of the lower surface of the flange part 154 is high. Thus, the strength of the second shield 150 connected to the connection pads on the surface of the second substrate can be made extremely high. Moreover, since no gap is created between the connection pads on the surface of the second substrate, the electromagnetic shielding effect can also be made extremely high.

Furthermore, each of the protruding end parts 122 at two ends of the second connector 101 in the longitudinal direction are covered by the outer wall 152 of the second shield 150 on the outer wall surface facing an outer side in the longitudinal direction and two sides in the width direction of the second connector 101, the upper surface 122*b* facing the mating surface 101*a* of the second connector 101 is covered by the upper wall 153 of the second shield 150, and the inner wall surface 122*c* facing an inner side in the longitudinal direction of the second connector 101 is covered by the inner wall 151 of the second shield 150. Therefore, an entire circumference is shielded, and the second high-frequency terminal 171 supported by the second high-frequency terminal supporting part 116 formed on the protruding end part 122 is very effectively electromagnetically shielded.

Thus, the second connector 101 can transmit a high-frequency signal even though with a compact and low profile, because the strength and the electromagnetic shielding effect are high. For example, even if the dimensions in the longitudinal, width, and height directions of the second connector 101 are set to 2.9 [mm] or less, 1.9 [mm] or less, and 0.7 [min] or less, the second high-frequency terminal 171 can transmit a high-frequency signal of approximately 60 [GHz].

Next, the operation of mating the first connector 10 and the second connector 101 with the above configuration is described.

Figure 10:
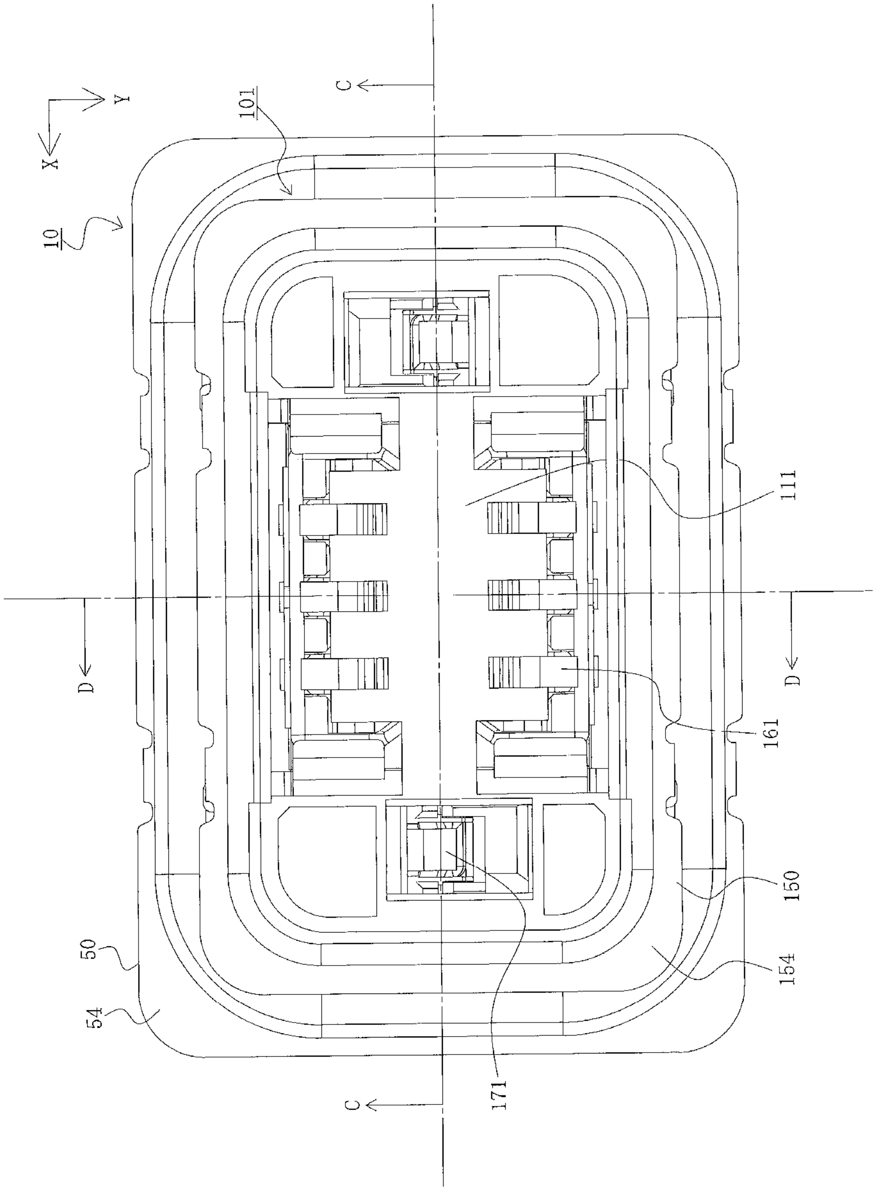
FIG. 10 is a plan view of an initial mating state of the first connector and second connector according to Embodiment 1.
Figure 11A:
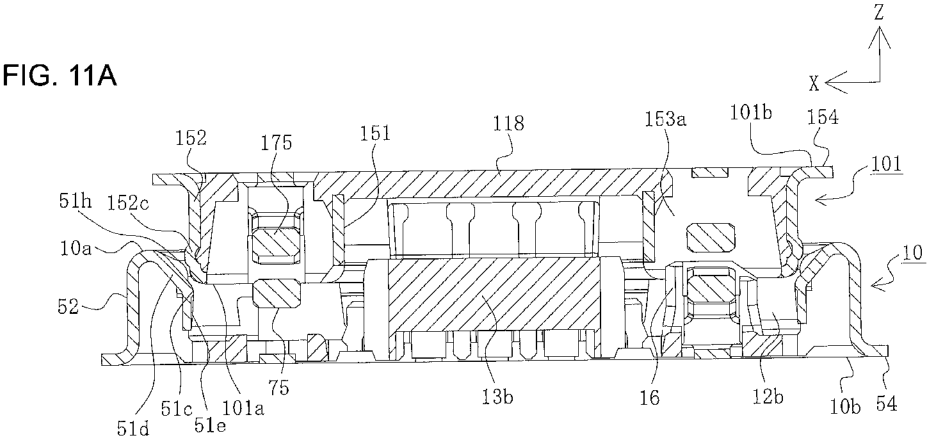
FIGS. 11A and 11B are cross-sectional views of the initial mating state between the first connector and second connector according to Embodiment 1, where
Figure 11B:
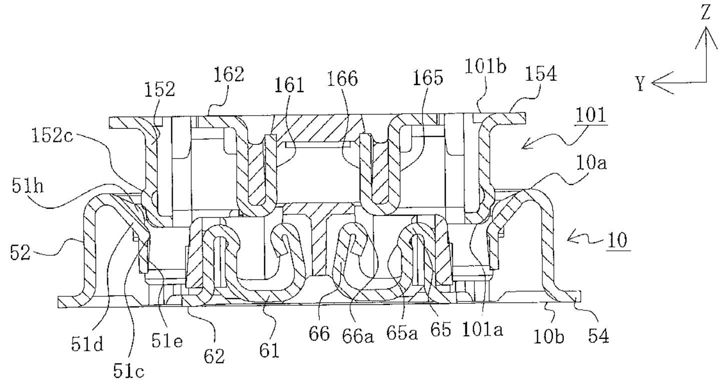
Figure 12:
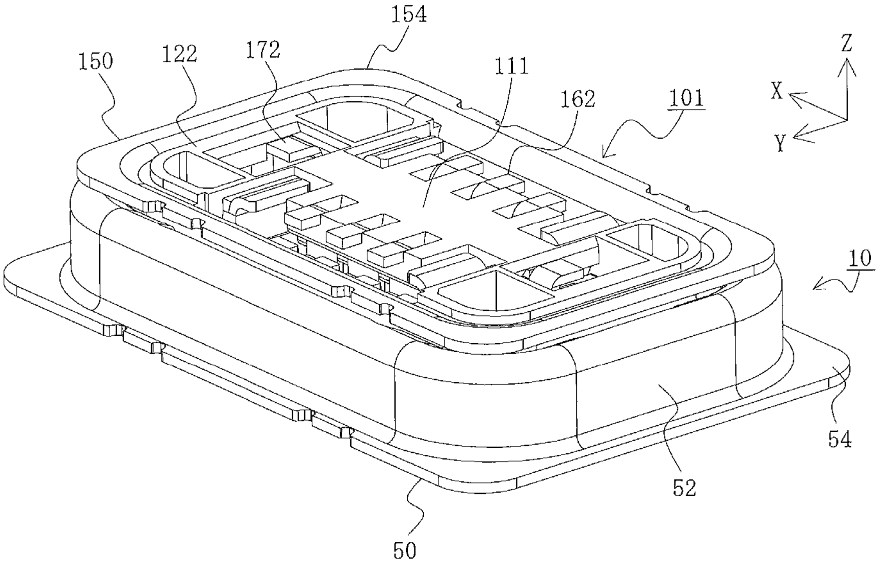
FIG. 12 is a perspective view of the mating completed state of the first connector and second connector according to Embodiment 1.
Figure 13:
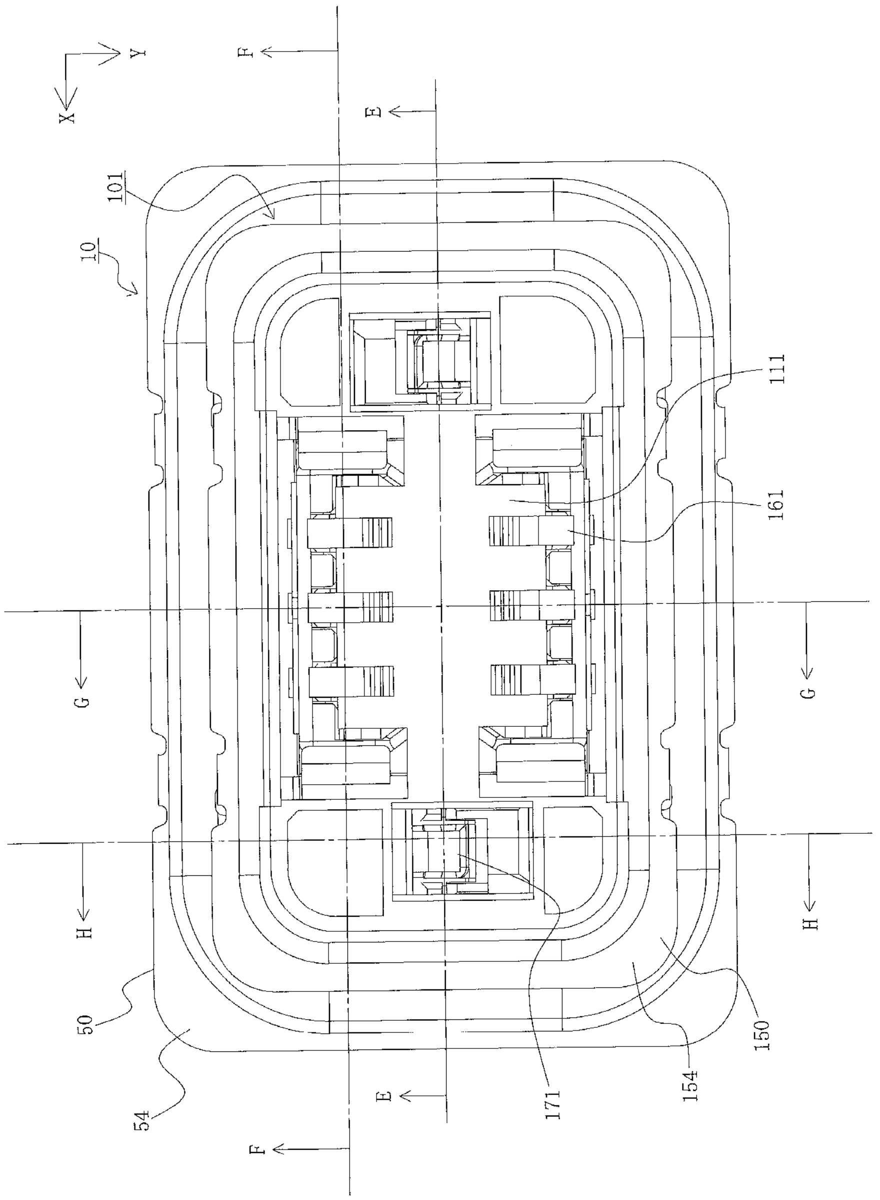
FIG. 13 is a plan view of the completed mating state of the first connector and second connector according to Embodiment 1.
Figure 14A:
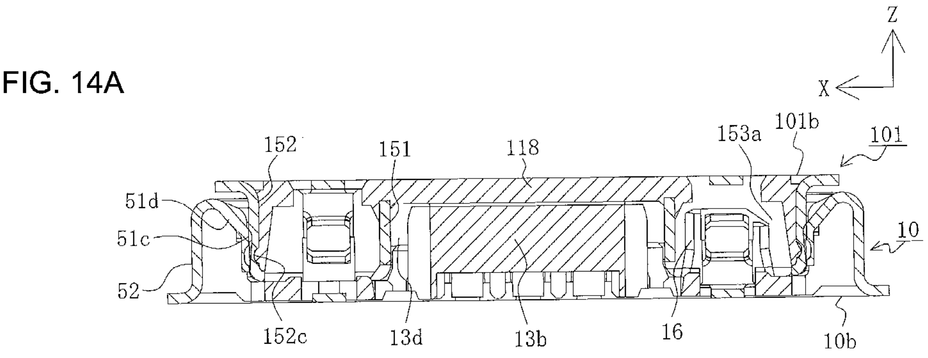
FIGS. 14A and 14B are side cross-sectional views of the completed mating state between the first connector and second connector according to Embodiment 1, where
Figure 14B:
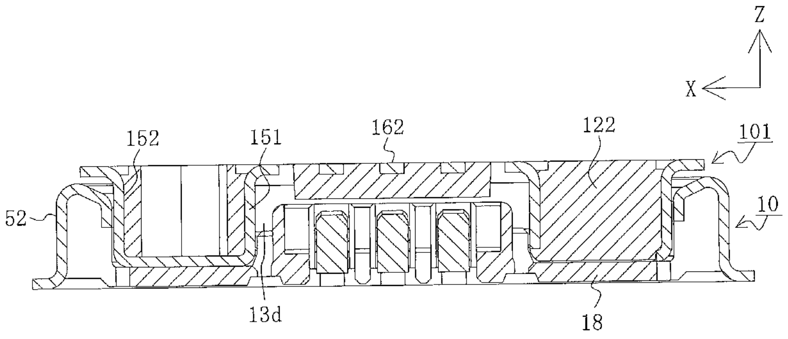
Figure 15A:
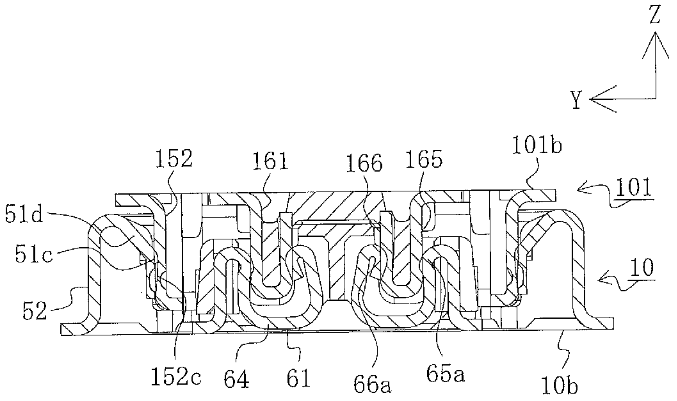
FIGS. 15A and 15B are lateral cross-sectional views of the completed mating state between the first connector and second connector according to Embodiment 1, where
Figure 15B:
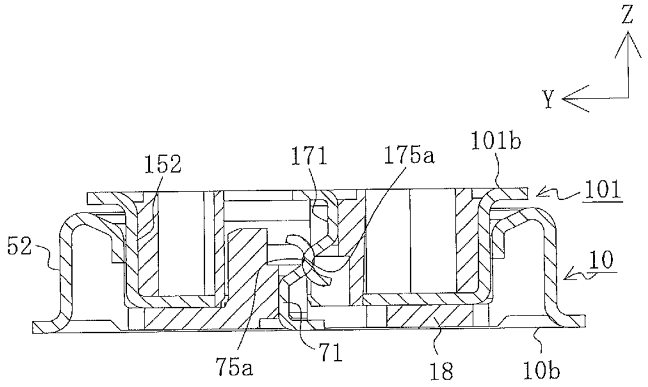

FIG. 10 is a plan view of the initial mating state between the first connector and the second connector in Embodiment 1. FIGS. 11A and 11B are cross-sectional views of the initial mating state between the first connector and the second connector in Embodiment 1. FIG. 12 is a perspective view of the mating completed state of the first connector and the second connector in Embodiment 1. FIG. 13 a plan view of the mating completed state for the first connector and the second connector in Embodiment 1. FIGS. 14A and 14B are side cross-sectional views of the completed mating state of the first connector and the second connector in Embodiment 1. FIGS. 15A and 15B are lateral cross-sectional views of the completed mating state of the first connector and the second connector in Embodiment 1. Note that FIG. 11A is a cross-sectional view as viewed along line C-C of FIG. 10, FIG. 11B is a cross-sectional view as viewed along line D-D of FIG. 10, and FIG. 14A is a cross-sectional view along line E-E in FIG. 13, and FIG. 14B is a cross-sectional view along line F-F in FIG. 13. FIG. 15A is a cross-sectional view along line G-G in FIG. 13, and FIG. 15B is a cross-sectional view along line H-H in FIG. 13.

Herein, the first connector 10 is surface mounted to the first substrate by connecting the tail part 62 of the first terminal 61, the tail part 72 of the first high-frequency terminal 71, and the bent part 52*a* and the flange part 54, which are continuously connected over the entire circumference to the lower end of the outer wall 52 that is continuous over the entire circumference of the first shield 50, to a connection pad connected to a conductive trace of the first substrate (not shown) by soldering. Furthermore, a conductive trace connected to the connection pad to which the tail part 72 of the first high-frequency terminal 71 is connected is a signal line and transmits a high-frequency signal, like an antenna line connected to an antenna. A conductive trace connected to the connection pad to which the curved part 52*a* and the flange part 54 of the first shield 50 are connected is a ground line. Moreover, a conductive trace connected to the connection pad to which the tail part 62 of the first terminal 61 is connected is a signal line, which transmits a signal of lower frequency than the high-frequency signal.

Similarly, the second connector 101 is surface mounted to the second substrate by connecting the tail part 162 of the second terminal 161, the tail part 172 of the second high-frequency terminal 171, the tail part 151*b* of the inner wall 151 on the second shield 150, and the bent part 152*a* and the flange part 154, which are continuously connected over the entire circumference to the lower end of the outer wall 152 that is connected over the entire circumference in the second shield 150, to a connection pad connected to a conductive trace of the second substrate (not shown) by soldering. Furthermore, a conductive trace connected to the connection pad to which the tail part 172 of the second high-frequency terminal 171 is connected is a signal line and transmits a high-frequency signal, like an antenna line connected to an antenna. A conductive trace connected to the connection pad to which the tail part 151*b* of the inner wall 151 of the second shield 150 and the bent part 152*a* and the flange part 154 of the second shield 150 is a ground line. Moreover, a conductive trace connected to the connection pad to which the tail part 162 of the second terminal 161 is connected is a signal line, which transmits a signal of lower frequency than the high-frequency signal.

First, an operator places the mating surface 10*a* of the first connector 10 and the mating surface 101*a* of the second connector 101 so as to face each other as illustrated in FIG. 1 and when the position of the first protruding part 13 of the first connector 10 matches the position of the second recess 113 of the second connector 101 and the position of the protruding end part 122 of the second connector 101 matches the position of the mating recess 12*b* corresponding to the first connector 10, the positioning of the first connector 10 and the second connector 101 is completed.

In this state, when the first connector 10 and/or the second connector 101 are moved in a direction approaching a counterpart side, in other words, in a mating direction, the second shield 150 of the second connector 101 is inserted into the housing part 50*d* of the first shield 50 of the first connector 10, the first protruding part 13 of the first connector 10 is inserted into the second recess 113 of the second connector 101, and the protruding end part 122 of the second connector 101 is inserted into the mating recess 12*b* of the first connector 10.

Note that the connecting part 53 of the first shield 50 is present on the mating surface 10*a* of the first connector 10 so as to surround a circumference thereof, and the outer wall 152 and the upper wall 153 of the second shield 150 are present on the mating surface 101*a* of the second connector 101. Therefore, the mating surface 10*a* of the first connector 10 and the mating surface 101*a* of the second connector 101 will not be damaged or broken even when coming into contact with each other.

Furthermore, in the initial mating state illustrated FIGS. 10, 11A and 11B, or in other words, in a state where the portion near the mating surface 101*a* of the second shield 150 of the second connector 101 enters slightly into the housing part 50*d* of the first shield 50 of the first connector 10, the portion near the mating surface 101*a* of the outer wall 152 at the corner part 150*c* of the second shield 150 comes into contact with the gradual oblique surface part 51*h* near the upper end of the mating positioning part 51*b* (near the mating surface 10*a*) in the corner parts 50*c* of the first shield 50, and is inserted into the housing part 50*d* while in contact with and being guided by the gradual oblique surface part 51*h* as illustrated in FIGS. 11A and 11B. Thereby, the second connector 101 is positioned with respect to the first connector 10. Note that the corner part 50*c* included in the mating positioning part 51*b* is integrated with the corner part 17 of the first housing 11, and the back side thereof is filled with the insulating material constituting the first housing 11, and therefore the corner part is robust. Therefore, the mating positioning part 51*b* has high robustness, and even if the portion near the mating surface 101*a* of the second shield 150 of the second connector 101 comes into contact with the mating positioning part 51*b*, the mating positioning part 51*b* will not be deformed or damaged.

Furthermore, the portion near the mating surface 101*a* of the outer wall 152 at the corner part 150*c* of the second shield 150 comes into contact with the oblique surface part

51*d* of the mating spring part 51*a* of the first shield 50 after coming into contact with the gradual oblique surface part 51*h*. As a result, damage to the mating spring part 51*a* can be reduced.

Thus, as illustrated in FIGS. 12-15B, when the mating of the first connector 10 and the second connector 101 is completed, the first terminal 61 and the second terminal 161 conduct electricity, and the first high-frequency terminal 71 and the second high-frequency terminal 171 achieve an electrically conductive state.

Specifically, the pair of terminal support walls 112*a* of the second protruding part 112 of the second housing 111 are inserted into the pair of inner recessed groove parts 12*a* of the first housing 11, and as illustrated in FIG. 15A, the contacting part 65*a* of the outer side connecting part 65 and the contact part 66*a* of the inner side connecting part 66 of the first terminal 61 that protrude into the inner groove portion 12*a* and face each other come into contact with the outer side connecting part 165 and the inner side connecting part 166 of the second terminal 161 exposed on the outer side surface and the inner side surface of the terminal support wall 112*a*.

At this time, the lower side connecting parts 64 of the first terminal 61 and a vicinity thereof have an essentially U-shaped shape and are elastically deformable, such that the interval between the mutually facing outer side connecting part 65 contacting part 65*a* and the inner side connecting part 66 contacting part 66*a* is elastically expandable. Therefore, the interval between the contacting part 65*a* on the outer side connecting part 65 and the contacting part 66*a* on the inner side connecting part 66 are elastically pushed apart by the second terminal 161 inserted therebetween and as a reaction thereof, the second terminal 161 is elastically sandwiched from two sides by the contacting part 65*a* of the outer side connecting part 65 and the contacting part 66*a* of the inner side connecting part 66. As a result, the contacting part 65*a* of the outer side connecting part 65 of the first terminal 61 and the outer side connecting part 165 of the second terminal 161, as well as the contacting part 66*a* of the inner side connecting part 66 of the first terminal 61 and the inner side connecting part 166 of the second terminal 161 maintain contact and do not separate even when subjected to shock or vibration and thus can maintain a stable state of electrical conduction. Furthermore, the mutually corresponding first terminal 61 and second terminal 161 are in a state of contact at two points, a so-called two-point contact, and even if contact at one point is released, the contact at the other point is maintained, and thus a contact state can be stably maintained.

Furthermore, the first high-frequency terminal supporting part 16 positioned in the mating recess 12*b* is inserted into the first high-frequency terminal stowing recess 116*c* of the protruding end part 122, and the contacting part 75*a* of the first high-frequency terminal 71 and the contacting part 175*a* of the second high-frequency terminal 171 contact each other as illustrated in FIG. 15B. At this time, the contacting parts 75*a* and 175*a* of the first high-frequency terminal 71 and the second high-frequency terminal 171 are elastically displaceable in the width direction of the first connector 10 and the second connector 101 because the bent upper side connecting parts 75 and 175 are themselves elastically deformable. As a result, the contacting part 75*a* of the first high-frequency terminal 71 and the contacting part 175*a* of the second high-frequency terminal 171 corresponding to each other maintain contact and do not separate even when subjected to shock or vibration, and thus can maintain a stable state of electrical conduction. Note that the first high-frequency terminal 71 and the second high-frequency terminal 171 corresponding to each other contact each other at only one point, a so-called single contact point, such that no unintended stubs or divided circuits are formed in the signal transmission line from the tail part 72 of the first high-frequency terminal 71 to the tail part 172 of the second high-frequency terminal 171. Therefore, the impedance of the transmission line can be stabilized and favorable SI characteristics can be achieved.

In this manner, the first high-frequency terminal 71 and second high-frequency terminal 171, which are in contact with each other, have entire circumferences that are continuously surrounded by the inner wall 51 and outer wall 52 of the first shield 50 and the inner wall 151 and outer wall 152 of the second shield 150, and moreover, are continuously surrounded, thereby being extremely effectively shielded. Therefore, the impedance of the transmission line of a signal from the tail part 72 of the first high-frequency terminal 71 to the tail part 172 of the second high-frequency terminal 171 is stabilized, and favorable SI characteristics can be achieved.

Furthermore, when the second shield 150 of the second connector 101 is inserted into the housing part 50*d* of the first shield 50 of the first connector 10, the outer surface of the outer wall 152 of the second shield 150 contacts or approaches the inner surface of the inner wall 51 of the first shield 50 and as illustrated in FIGS. 14A and 15A, the engaging protrusion 152*c* formed on the outer wall 152 of the second shield 150 and the engaging protruding part 51*c* formed on the inner wall 51 of the first shield 50 are engaged. Note that the mating spring part 51*a* of the inner wall 51, in which the engaging protruding part 51*c* is formed, is separated from another portion by the slit part 53*a* at two ends thereof and is relatively flexible; and a state of engagement with the engaging protrusion 152*c* of the outer wall 152 of the second shield 150 can be reliably maintained. As a result, the first shield 50 and the second shield 150 become locked and release of the mating state between the first connector 10 and the second connector 101 is prevented. Furthermore, the first shield 50 and the second shield 150 are in contact with each other and are electrically conductive and at equipotential, and therefore, electromagnetic shielding is improved.

Thus, in the present Embodiment, the connector pair contains: the first connector 10 provided with the first housing 11, the first terminal 61 attached to the first housing 11, the first high-frequency terminal 71 attached to the first housing 11, and the first shield 50 enclosing the entire circumference of the first housing 11; and the second connector 101 that mates with the first connector 10, which is provided with the second housing 111, the second terminal 161 attached to the second housing 111, the second high-frequency terminal 171 attached to the second housing 111, and the second shield 150 enclosing the entire circumference of the second housing 111. Furthermore, the second connector 101 is mounted in the second housing 111, and an inner wall 151 that extends in the width direction of the second connector 101 is also provided between the second terminal 161 and the second high-frequency terminal 171.

As a result, the first terminal 61 and the first high-frequency terminal 71 and the second terminal 161 and the second high-frequency terminal 171 can be attached to the compact and low-profile first connector 10 and second connector 101, which are mounted on the first substrate and the second substrate. Thus, high strength can be exhibited, a high shielding effect can be achieved, and reliability is improved, even with the compact and low profile.

Furthermore, with the present Embodiment, the first connector 10 has a first housing 11, a first terminal 61 mounted in the first housing 11, a first high-frequency terminal 71 mounted in the first housing 11, and a first shield 50 that encompasses the entire circumference of the first housing 11, and mounts with the second connector 101. Furthermore, the first shield 50 includes an oblique surface part 51*d* and a gradually oblique surface part 51*h* as oblique parts that extend obliquely downward and that are formed at the inner edge at the upper end, long side parts 50*a* and short side parts 50*b* as a plurality of linear parts, and a plurality of corner parts 50*c*. The first shield is integrally connected with the first housing 11 at the corner part 50*c*, and is separated from the first housing 11 at the long side parts 50*a* and the short side parts 50*b*.

Therefore, the entire periphery of the first housing 11 of the first connector 10 in which the first terminal 61 and the first high-frequency terminal 71 are mounted is encompassed by the first shield 50, and the corner parts 50*c* of the first shield 50 are integrally connected to the first housing 11, and therefore a high shielding effect can be achieved, and reliability can be enhanced while demonstrating high strength with a compact and low profile.

Furthermore, the first shield 50 includes an outer wall 52, an inner wall 51 essentially parallel to the outer wall 52 on the inside of the outer wall 52, a connecting part 53 that connects an upper end of the outer wall 52 with an upper end of the inner wall 51, a flange part 54 that extends outward and is connected to a lower end of the outer wall 52, and a housing part 50*d* that houses the second connector 101, which is the housing part 50*d* with a periphery encompassed by the inner wall 51. The inner wall 51 at the long side part 50*a* and the short side part 50*b* includes a mating spring part 51*a* that is in elastic contact with the second shield 150 of the second connector 101. Therefore, the first shield 50 can reliably maintain contact with the second shield 150 of the second connector 101 and will not be damaged or broken.

Furthermore, the outer wall 52 and the flange part 54 are continuous over an entire circumference of the first housing 11. Therefore, the strength and shielding effectiveness of the first shield 50 are improved, and consequently, the strength and shielding effectiveness of the first connector 10 are improved.

Furthermore, the mating spring part 51*a* is separated from the other portions of the inner wall 51 along the long side part 50*a* and the short side part 50*b* by the slit part 53*a*. Therefore, the mating spring part 51*a* can freely elastically deform, and contact with the second shield 150 of the second connector 101 can be positively maintained. Furthermore, an external force received by the first shield 50 is prevented from being transmitted to the first housing 11, and the first housing 11 will not be damaged or broken.

Furthermore, the mating spring part 51*a* includes an oblique surface part 51*d* that extends obliquely downward to the inside of the housing part 50*d* from the connecting part 53, and an engaging protruding part 51*c* that protrudes toward the inside of the housing part 50*d* and that is formed at a lower end of the oblique surface part 51*d*. Therefore, when the first connector 10 and the second connector 101 are mated, the second shield 150 can be smoothly guided by the oblique surface part 51*d*, and the engaging protruding part 51*c* can securely engage with the second shield 150, and therefore mating disengagement between the first connector 10 and the second connector 101 can be prevented.

Furthermore, the corner part 50*c* includes a gradual oblique surface part 51*h* that is a gradual oblique surface part 51*h* that extends obliquely downward to the inside of the housing part 50*d* from the connecting part 53, and has an oblique angle that is more gradual than the oblique surface part 51*d*. Therefore, when the first connector 10 and the second connector 101 are mated, the gradual oblique surface part 51*h* is brought into contact with the second connector 101 that is inserted in the housing part 50*d*, and then the oblique surface part 51*d* is brought into contact, so damage to the mating spring part 51*a* can be reduced.

Furthermore, in the corner parts 50*c*, the space demarcated by the outer wall 52, inner wall 51, and the connecting part 53 is filled with the constituent material of the first housing 11. Therefore, the corner part 50*c* has high robustness, and will not deform or be destroyed even if contacted by the second shield 150 of the second connector 101, and therefore positioning of the second connector 101 with regard to the first connector 10 can be positively performed when the first connector 10 and the second connector 101 are mated together.

Furthermore, in the present Embodiment, the second connector 101 contains the second housing 111, the second terminal 161 that is mounted in the second housing 111, the second high-frequency terminal 171 that is mounted in the second housing 111, and the second shield 150 that encompasses the entire circumference of the second housing 111. Furthermore, the second shield 150 contains an inner wall 151 that extends in the width direction of the second connector 101 between the second terminal 161 and the second high-frequency terminal 171, and thus the first shield 50 and the second shield 150 make contact and are conductive when the first connector 10 and the second connector 101 are mated. Therefore, high strength, high shielding effect, and reliability can be enhanced with a compact and low profile.

Furthermore, with this Embodiment, the first connector 10 has a first housing 11, a first terminal 61 mounted in the first housing 11, a first high-frequency terminal 71 mounted in the first housing 11, and a first shield 50 that encompasses the first housing 11, and mates with the second connector 101. Furthermore, the first shield 50 contains long side parts 50*a* and short side parts 50*b* as four linear parts, and four corner parts 50*c*, and also contains the outer wall 52, the inner wall 51 that is essentially parallel to the outer wall 52 on the inner side of the outer wall 52, and the connecting part 53 that connects the upper end of the inner wall 51 with the upper end of the outer wall 52. The lower part of the outer wall 52 is connected to the first substrate, and at the corner parts 50*c*, the space demarcated by the outer wall 52, inner wall 51, and the connecting part 53 is filled with the constituent material of the first housing 11, and the inner wall 51 at the long side part 50*a* and the short side part 50*b* contains a mating spring part 51*a* that can contact the second connector 101, and thus when viewed from the mating direction, the end recessed part 18*c* and the outer recessed groove part 12*c* are formed where the first housing 11 does not exist in the region where the mating spring parts 51*a* are provided, and thus the mating spring parts 51*a* are not redundant for the first terminal 61 and the first high-frequency terminal 71. Therefore, high strength, high shielding effect, and reliability can be enhanced with a compact and low profile.

Next, Embodiment 2 will be described below. Note that, for portions having the same structure as that of Embodiment 1, descriptions thereof are omitted by giving the same reference numerals thereto. Moreover, descriptions of the same operations and effects as those of Embodiment 1 will be omitted.

Figure 16:
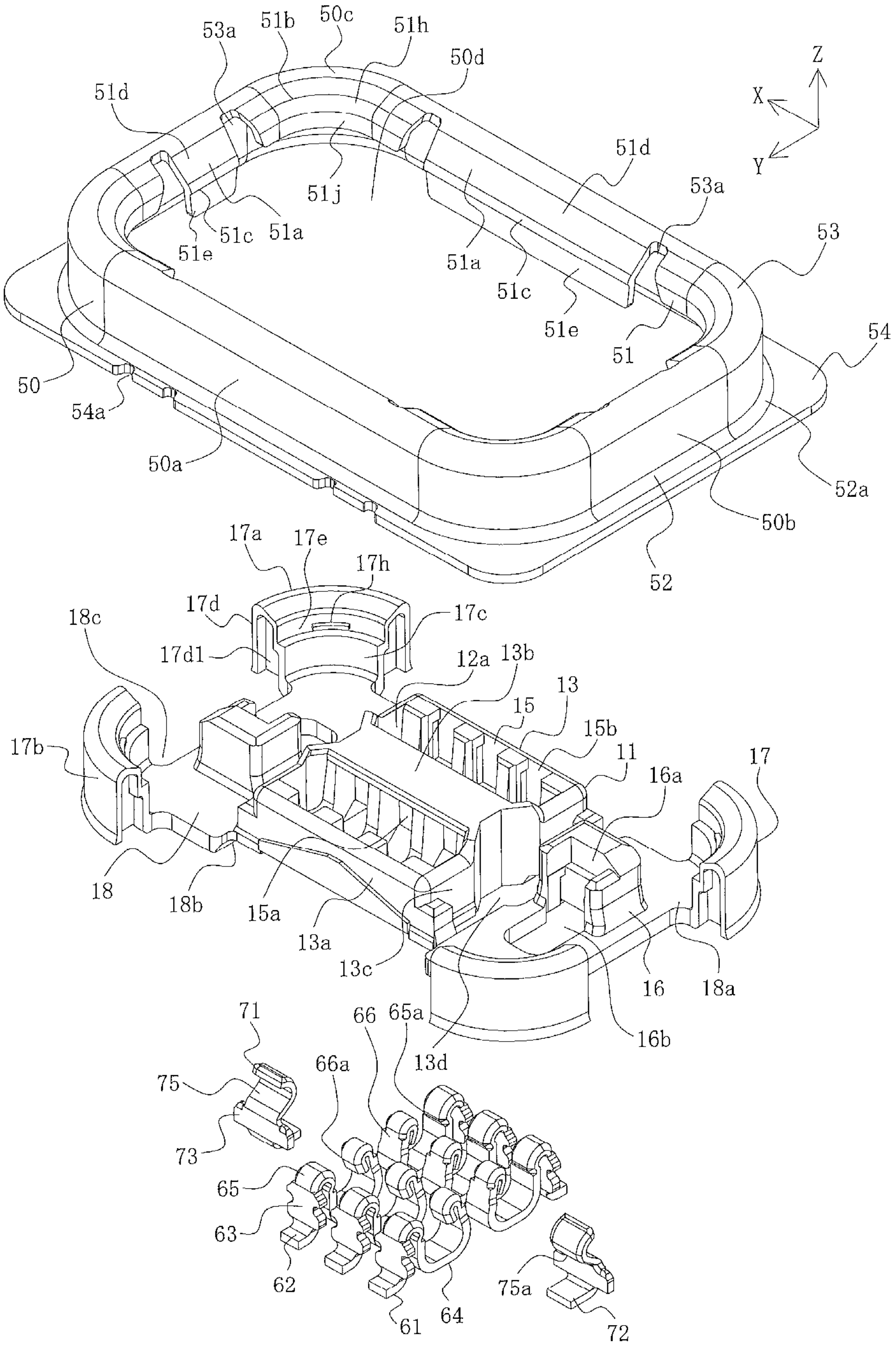
FIG. 16 is an exploded view of the first connector according to Embodiment 2.
Figure 17A:
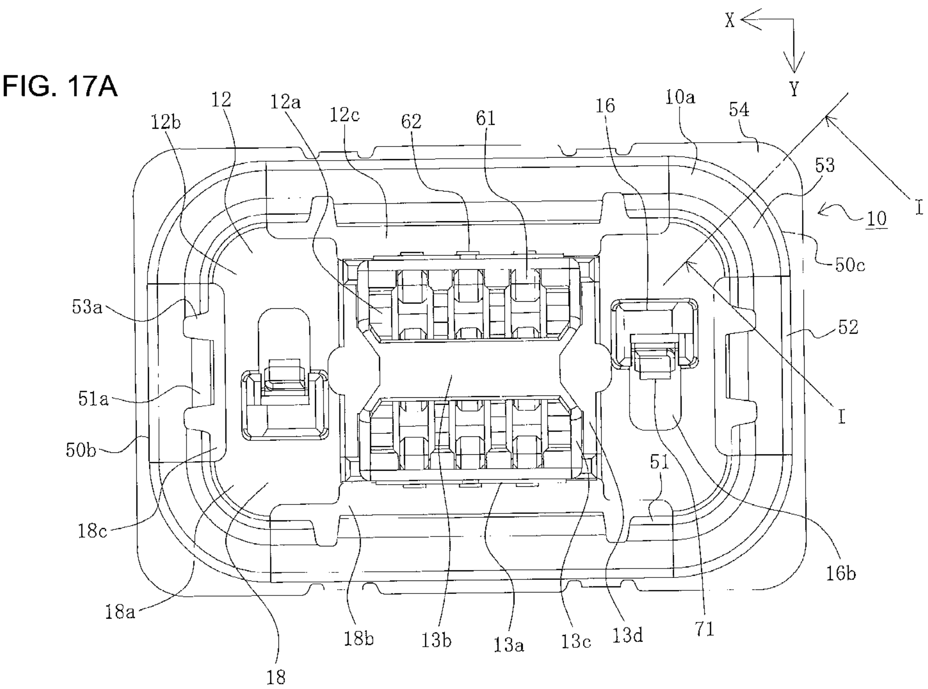
FIGS. 17A and 17B are two surface views of the first connector according to Embodiment 2, where
Figure 17B:
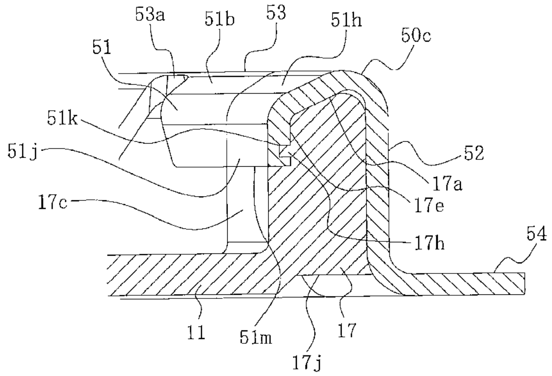
Figure 18A:
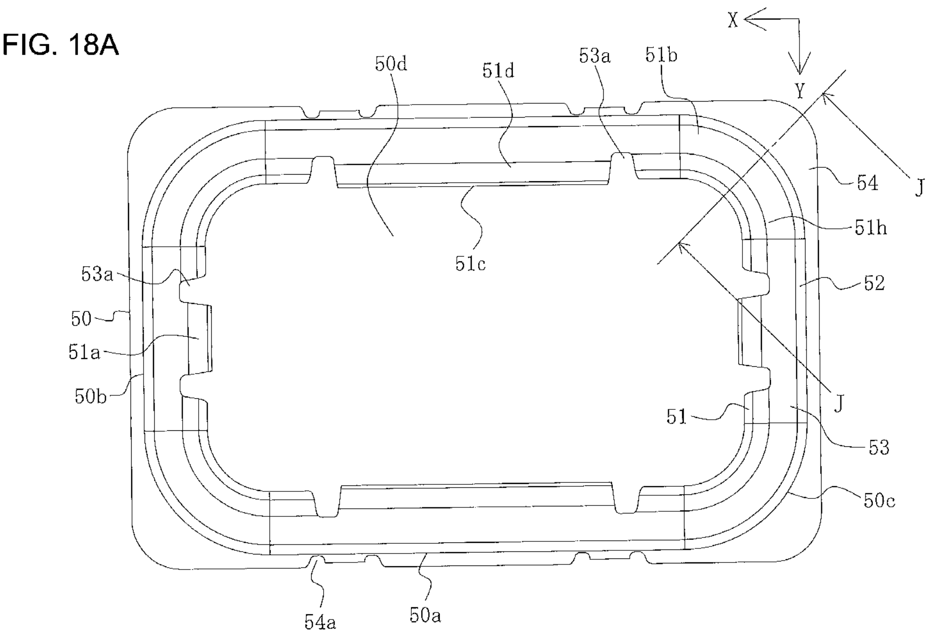
FIGS. 18A and 18B are two surface views of the first shield according to Embodiment 2, where
Figure 18B:
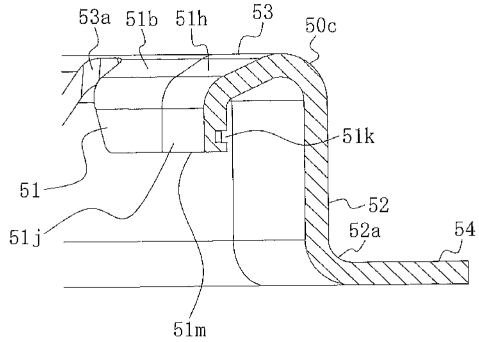
Figure 19A:
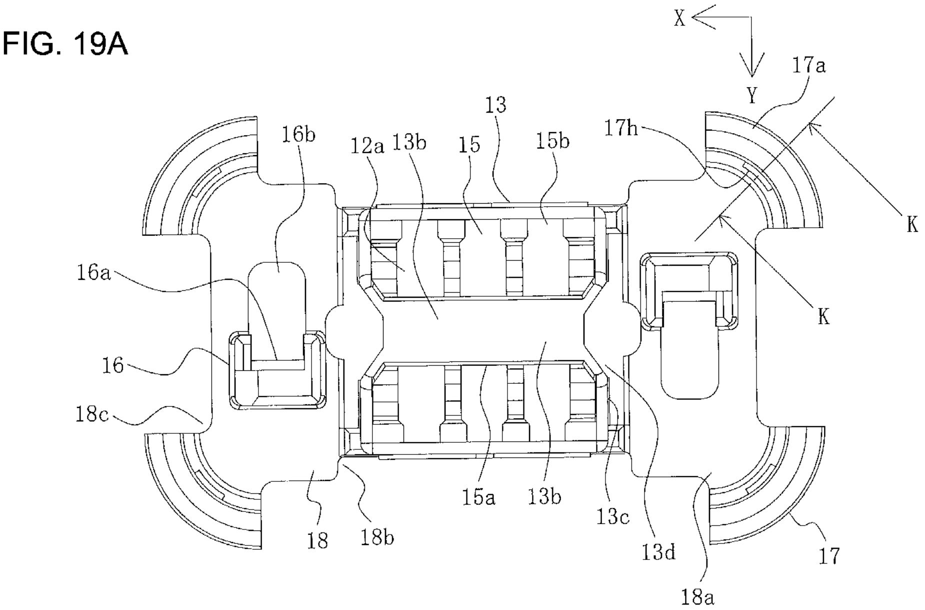
FIGS. 19A and 19B are two surface views of the first housing according to Embodiment 2, where
Figure 19B:
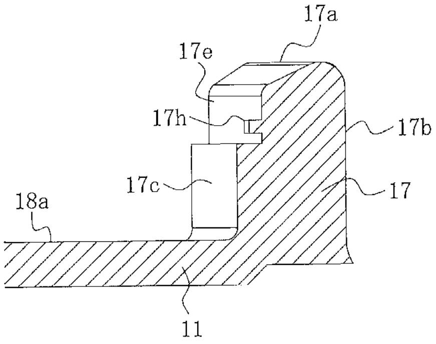
Figure 20:
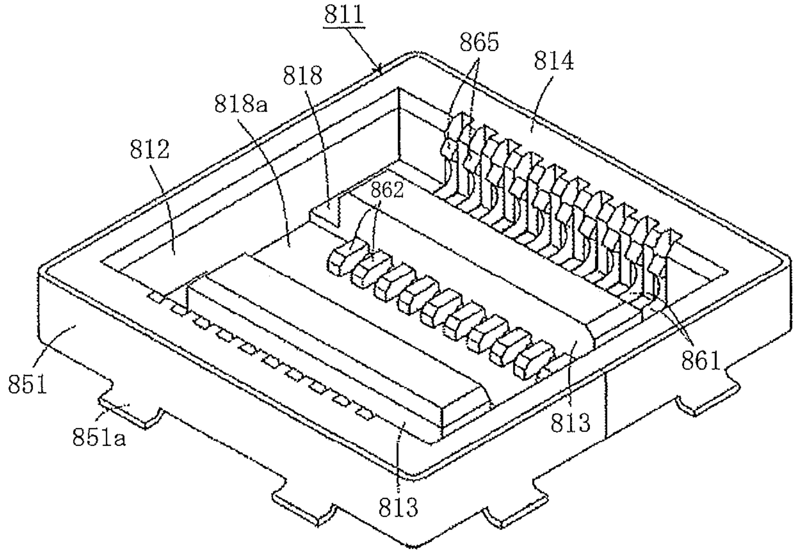
FIG. 20 is a perspective view illustrating a conventional connector.

FIG. 16 is an exploded view of the first connector of Embodiment 2, FIGS. 17A and 17B are two surface views of the first connector of Embodiment 2, FIGS. 18A and 18B are two surface views of the first shield of Embodiment 2, and FIGS. 19A and 19B are two surface views of the first housing of Embodiment 2. Note that FIG. 17A is a plan view, and FIG. 17B is a cross-sectional view along line I-I of FIG. 17A; FIG. 18A is a plan view, and FIG. 18B is a cross-sectional view along line J-J of FIG. 18A; and FIG. 19A is a plan view, and FIG. 19B is a cross-sectional view along line K-K of FIG. 19A.

Furthermore, the first connector 10 of the present Embodiment is similar to that of Embodiment 1, and has: a first shield 50 as a first outer side shield, which is a receptacle shield formed by punching, drawing, or the like on a conductive metal plate; and a first housing 11 as a first connector main body integrally formed by an insulating material such as a synthetic resin or the like. Furthermore, if the first shield 50 is integrated with the first housing 11 by overmolding or insert molding, the first housing 11 will be integrally connected to the first shield 50 at the corner parts 17 of the four corners. Therefore, the first housing 11 and the first shield 50 do not exist separately, but in FIG. 16, the housing 11 and the first shield 50 are shown to exist separately for the convenience of describing, and in FIGS. 18A and 19A, the first housing 11 and the first shield 50 are shown to be separate.

Each of the corners parts 17 in the present Embodiment are similar to those of Embodiment 1, and they include an upper wall part 17*a* shaped like one of four sections of a cylindrical wall, having an arc shape with a central angle of approximately 90 degrees in plan view; a cylindrical outer wall part 17*b* extending downward (in the negative direction of the Z-axis) from the outer edge of the upper wall part 17*a*; a cylindrical inner wall part 17*c* extending downward from the inner edge of the upper wall part 17*a*; and a pair of flat side wall parts 17*d* extending downward from the edge of the upper wall 17*a* corresponding to the two ends of an arc with a central angle of approximately 90 degrees. Note that in the example illustrated in FIG. 16, a recessed entry part 17*d*1 with a recessed entry excluding the peripheral edge is formed in each side wall part 17*d*, but the recessed entry part 17*d*1 can be omitted, and the side wall part 17*d* can be flat, similar to Embodiment 1.

Furthermore, the inner wall part 17*c* has a shield housing part 17*e* recessed to house the inner wall 51 at the corner part 50*c* included in the mating positioning part 51*b* of the first shield 50. However, with the present Embodiment, the shield housing part 17*e* is different from that of Embodiment 1, and does not have a fan-shaped part 17*f*, but the lower end part is formed to be essentially parallel to the upper surface of the connecting part 18*a* of the bottom plate 18. Furthermore, as illustrated in FIG. 16 and FIG. 19B, a locking protruding part 17*h* is preferably formed so as to protrude toward the inside of the housing part 50*d* as a locking part, for at least a portion of the vicinity of the lower end of the shield housing part 17*e*.

In addition, with the present Embodiment, the corner parts 50*c* that are included in the mating positioning part 51*b* of the first shield 50 differ from that of Embodiment 1, and do not include a fan-shaped part 51*f*, and the lower end part is formed so as to be essentially parallel to the upper surface at the flange part 54. Furthermore, the upper end vicinity of the mating positioning part 51*b* that includes the corner part 50*c* has a gradual oblique surface part 51*h* that is sloped gradually facing downward toward the inside of the housing part 50*d*, similar to Embodiment 1.

Note that with the present Embodiment, the mating positioning part 51*b* includes a positioning lower part 51*j* that extends essentially vertically downward from the lower end of the gradual oblique surface part 51*h*. Furthermore, as illustrated in FIG. 18B, the inner wall surface of the positioning lower part 51*j*, or in other words at least a portion in the vicinity of the lower end part of the wall surface that faces the outer wall 52 preferably has a locking recessed part 51*k* with a groove entry that is formed toward the inside of the housing part 50*d* as the lockable part.

Therefore, as illustrated in FIG. 17B, when the first shield 50 is integrated with the first housing 11 by over molding or insert molding, a portion of the constituent material of the first housing 11 that is filled on the back side of the corner parts 50*c* penetrates into the locking recessed part 51*k*, forming the locking protruding part 17*h*, and thus the locking protruding part 17*h* and the locking recessed part 51*k* will engage together. Therefore, the corner parts 50*c* and the corner part 17 will be securely integrated and cannot separate. Note that the outer wall surface of the positioning lower part 51*j*, or in other words the wall surface facing the inside of the housing part 50*d* is essentially on the same plane extending in a vertical direction from the inner wall part 17*c* of the corner part 17. Note that the recesses and protrusions of the locking protruding part 17*h* and the locking recessed part 51*k* may have mutually opposing shapes for the recesses and protrusions, or in other words, the lockable part can be formed as the locking protruding part, and the locking part can be formed as the locking recessed part.

Furthermore, with the present Embodiment, the length of the portion of the first housing 11 that is filled on the back side of the corner parts 50*c* which is the curved part of the first shield 50, or in other words, the arc in the cylindrically shaped inner wall part 17*c* that is the inner side surface of the corner parts 17 is set to be shorter than the length of the arc in the lower end 51*m* of the inner wall 51 at the corner parts 50*c*. Therefore, when the first connector 10 and the second connector 101 are mated together, the second connector 101 that is inserted into the housing part 50*d* is guided by the gradual oblique surface part 51*h* of the corner part 50*c* without being affected by the inner wall part 17*c*, and thus reliable mating to the first connector 10 can be achieved.

Furthermore, with the present Embodiment, the position of the lower end 17*j* of the corner parts 17 is set to be higher than the position of the lower end of the outer wall 52 at the corner parts 50*c*, as shown in FIG. 17B. Therefore the flange part 54 that is connected to the lower end of the outer wall 52 can be securely connected to a connecting pad of the first substrate by using solder, and the first connector 10 can be securely mounted to the first substrate.

In addition, the basic configuration of the first connector 10 and the second connector 101 in the present Embodiment are the same as that of Embodiment 1 described above; therefore, a description thereof is omitted.

Furthermore, an operation of mating the first connector 10 and the second connector 101 in the present Embodiment and basic configurations and effects of the state of being mated and other points of the first connector 10 and the second connector 101 are the same as those of Embodiment 1 described above; therefore, descriptions thereof are omitted.

Note that the disclosure herein describes features relating to suitable exemplary Embodiments. Various other Embodiments, modifications, and variations within the scope and spirit of the claims appended hereto will naturally be conceived of by those skilled in the art upon review of the disclosure herein.

The present disclosure can be applied to a connector and a connector pair.

The invention claimed is:

1. A first connector that mates with a second connector, comprising:

a first connector main body including a bottom plate and corner parts extending upward from the bottom plate, each corner part having opposite first and second ends, wherein spaces are provided between facing ends of adjacent corner parts, the corner parts defining a circumference of the first connector main body;

a first terminal attached to the first connector main body;

a first high-frequency terminal attached to the first connector main body; and a first shield surrounding the entire circumference of the first connector main body, the first shield including a plurality of linear parts and a plurality of corner parts, each linear part and each corner part of the first shield including an outer wall, an inner wall formed on an inward side of the outer wall, and a connecting part connecting an upper end of the outer wall and an upper end of the inner wall, wherein respective linear parts extend between respective corner parts of the first shield, wherein a housing space having a circumference defined by the inner wall is provided, and the second connector is insertable into the housing space, wherein at least one of the inner walls of the linear parts includes a mating spring part that is configured to elastically connect to a second shield of the second connector, the mating spring part includes an oblique part extending from the connecting part obliquely inward and downward from an inner edge at an upper end thereof, and an inner wall lower part formed at a lower end of the oblique part and which extends downward, and wherein the corner parts of the first connector main body are integrated with the corner parts of the first shield, and the linear parts of the first shield overlap the spaces and are separated from the first connector main body by the spaces.

2. The first connector according to claim 1, wherein the first shield further includes an outwardly extending flange part connected to a lower end of the outer walls, and wherein the outer walls and the flange parts are connected around the entire circumference of the first connector main body.

3. The first connector according to claim 1, wherein the mating spring part is separated from other parts of the inner wall at the linear parts by a slit part.

4. The first connector according to claim 1, wherein at least one of the corner parts of the first shield includes a gradual oblique surface part that extends from the connecting part obliquely inward and downward and has an oblique angle that is more gradual than the oblique part.

5. The first connector according to claim 1, wherein the first connector main body is formed of a constituent material, and a space defined by the outer wall, the inner wall, and the connecting part is filled with the constituent material of the first connector main body in each corner part of the first shield.

6. The first connector according to claim 5, wherein the inner wall of each corner part of the first shield has a lockable part, and the constituent material has locking parts that engage with the lockable parts.

7. A connector pair, comprising the first connector according to claim 1 and the second connector that mates with the first connector.

8. The connector pair according to claim 7, wherein the second connector includes:

a second connector main body;

a second terminal attached to the second connector main body;

a second high-frequency terminal attached to the second connector main body; and a second shield surrounding an entire circumference of the second connector main body;

the second shield including a second inner shield extending in a width direction of the second connector between the second terminal and the second high-frequency terminal; and wherein when the first and second connectors are mated, the first and second shields make electrically conductive contact.

9. A first connector that mates with a second connector in a mating direction, comprising:

a first connector main body formed of a constituent material and including a bottom plate and corner parts extending upward from the bottom plate, each corner part having opposite first and second ends, wherein spaces are provided between facing ends of adjacent corner parts, the corner parts defining a circumference of the first connector main body;

a first terminal attached to the first connector main body;

a first high-frequency terminal attached to the first connector main body; and a first shield that encompasses the first connector main body, the first shield including four linear parts and four corner parts, each linear part and each corner part of the first shield including an outer wall, an inner wall inside the outer wall and approximately parallel to the outer wall, and a connecting part connecting an upper end of the outer wall to an upper end of the inner wall, wherein a space defined by the outer wall, the inner wall, and the connecting part in each corner part of the first shield is filled with the constituent material of the first connector main body such that the corner parts of the first connector main body are formed, the inner wall of each linear part includes a mating spring part configured to contact the second connector, and wherein when viewed from the mating direction, the mating spring parts align with the spaces, and the mating spring parts do not overlap with the first terminal or with the first high-frequency terminal.

10. The first connector according to claim 9, wherein a housing space having a circumference defined by the inner wall is provided, and the second connector is insertable into the housing space; and wherein each mating spring part includes an oblique part extending from the connecting part obliquely inward and downward, and an inner wall lower part formed at a lower end of the oblique part and which extends downward.

11. The first connector according to claim 9, wherein each corner part of the first connector main body has cylindrical inner wall which defines an arc length, and the arc length of the cylindrical inner wall of respective corner part of the first connector main body is shorter than an arc length of a lower end of the inner wall of the first shield in the respective corner part of the first connector main body.

12. The first connector according to claim 11, wherein the lower end of the outer wall of the first shield at the respective corner part includes a flange part.

13. The first connector according to claim 9, wherein a location of a lower end of the first connector main body at the respective corner part of the first connector main body is higher than a location of a lower end of the outer wall of the first shield at the respective corner part of the first connector main body.

14. The first connector according to claim 9, wherein the inner wall of each corner part of the first shield has a lockable part, and the constituent material has locking parts that engage with the lockable parts.

15. A connector pair, comprising: the first connector according to claim 9, and the second connector that mates with the first connector.

16. The connector pair according to claim 15, wherein the second connector includes:

a second connector main body;

a second terminal attached to the second connector main body;

a second high-frequency terminal attached to the second connector main body; and a second shield surrounding an entire circumference of the second connector main body;

the second shield including a second inner shield extending in a width direction of the second connector between the second terminal and the second high-frequency terminal; and wherein when the first and second connectors are mated, the first and second shields make electrically conductive contact.

17. The first connector according to claim 9, wherein each mating spring part is formed of an oblique surface part.

18. A first connector that mates with a second connector in a mating direction, comprising:

a first connector main body formed of a constituent material;

a first terminal attached to the first connector main body;

a first high-frequency terminal attached to the first connector main body; and a first shield that encompasses the first connector main body, the first shield including four linear parts and four corner parts, each linear part and each corner part including an outer wall, an inner wall inside the outer wall and approximately parallel to the outer wall, and a connecting part connecting an upper end of the outer wall to an upper end of the inner wall, wherein a space defined by the outer wall, the inner wall, and the connecting part in each corner part is filled with the constituent material of the first connector main body, the inner wall of each linear part includes a mating spring part configured to contact the second connector, the inner wall of each corner part having a lockable part, and the constituent material has locking parts that engage with the lockable parts, and wherein when viewed from the mating direction, the first connector body is not present in regions where the mating spring parts are provided, and the mating spring parts do not overlap with the first terminal or with the first high-frequency terminal.

19. The first connector according to claim 18, wherein each mating spring part is formed of an oblique surface part.

20. A connector pair, comprising: the first connector according to claim 18, and the second connector that mates with the first connector.

* * * * *